United States Patent
Sugitani et al.

(10) Patent No.: US 9,413,453 B2
(45) Date of Patent: Aug. 9, 2016

(54) WIRELESS COMMUNICATION METHOD AND WIRELESS COMMUNICATION SYSTEM

(71) Applicant: Panasonic Intellectual Property Management Co., Ltd., Osaka (JP)

(72) Inventors: Toshiyuki Sugitani, Saga (JP); Shinji Fukuda, Fukuoka (JP); Toshihiro Nishimura, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 15 days.

(21) Appl. No.: 14/246,620

(22) Filed: Apr. 7, 2014

(65) Prior Publication Data

US 2014/0301377 A1    Oct. 9, 2014

(30) Foreign Application Priority Data

Apr. 9, 2013    (JP) .................. 2013-081543

(51) Int. Cl.
*H04B 7/26*    (2006.01)
*H04B 7/212*    (2006.01)
*H04W 72/04*    (2009.01)
*H04B 1/38*    (2015.01)

(52) U.S. Cl.
CPC .............. *H04B 7/2656* (2013.01); *H04B 7/212* (2013.01); *H04B 1/38* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 5,719,859 A | 2/1998 | Kobayashi et al. | |
| 2006/0082454 A1* | 4/2006 | Fukuda ................. | H04N 7/186 340/531 |
| 2007/0066300 A1* | 3/2007 | Nishimura ............ | G08C 17/02 455/426.1 |
| 2011/0018706 A1* | 1/2011 | Egawa ................. | G08B 25/009 340/539.1 |

FOREIGN PATENT DOCUMENTS

| | | |
|---|---|---|
| JP | 2005-286752 A | 10/2005 |
| JP | 2006-032998 A | 2/2006 |
| JP | 2006-121393 A | 5/2006 |
| JP | 2006-121394 A | 5/2006 |
| JP | 2007-013544 A | 1/2007 |

OTHER PUBLICATIONS

Japanese Office Action dated Mar. 3, 2015, for corresponding JP Application No. 2013-081543, 3 pages.

* cited by examiner

*Primary Examiner* — Kodzovi Acolatse
(74) *Attorney, Agent, or Firm* — Seed IP Law Group PLLC

(57) ABSTRACT

In a wireless communication system based on a time division multiple access method such as cordless telephone systems including a door camera, voice communication is performed in a bi-directional communication by using a paired time slots, and image communication is performed in a uni-directional communication by using both of paired time slots. One of the paired time slots may be used for transmitting a control signal such as an image data resend control signal.

7 Claims, 33 Drawing Sheets

WIRELESS COMMUNICATION METHOD AND WIRELESS COMMUNICATION SYSTEM

TECHNICAL FIELD

The present invention relates to a wireless communication method for performing a wireless communication between a master device and a slave device.

PRIOR ART

A conventional home intercom system includes a master device and a door slave device which is provided on the exterior of a door or an adjacent exterior part of the house not only to allow a visitor to speak with a person in the house by using a speaker phone but also to allow the person in the house to see the visitor by using a camera provided on the door slave device. See JP2006-032998A, for instance.

JP2005-286752A discloses a TDMA (Time Division Multiple Access) wireless communication system for transmitting image information from a master device to a slave device. In this system, each prescribed time interval (frame) is divided into a plurality of slots, and wireless communication is individually performed by using each slot. The image information transmitted from the master device is tagged with sequence numbers, and transmitted with some redundancy by using different slots. The slave device receives the image data and reconstructs the original image data while discarding the redundant part of the data. Owing to the redundancy, even when an error should occur in receiving the image data, the slave device is enabled to reconstruct the whole image.

In the wireless communication device disclosed in JP2006-121394A, the data length of each packet is variably controlled depending on the particular communication method such that the packet size is reduced when the communication method does not include a resend control and is increased when the communication method includes a resend control Various communication methods are known for wireless communication between a master device and a slave device. In JP2006-032998A, the CDMA (Code Division Multiple Access) and TDMA (Time Division Multiple Access) methods are used. The CDMA allows simultaneous multiple wireless communications, but requires a high processing capability because the receiving end of CDMA communication is required to detect a specific pattern in the signal from the transmitting end and reconstruct the data string by analyzing the pattern.

The wireless communication system disclosed in JP2005-286752A is based on a TDMA (Time Division Multiple Access) communication, and includes some redundancy in the transmitted data so that the loss of information may be avoided even when an error should occur in the data reception, however, at the expense of the transmission speed for the image data.

In the wireless communication device disclosed in JP2006-121394A, the packet size is reduced when the communication method does not include a resend control so that the loss of information may be minimized if a reception error should occur. On the other hand, when the communication method includes a resend control, the packet size is increased so that the overhead for packetizing the data to be transmitted can be minimized, and the transmission speed of the data can be increased. However, this prior patent publication does not specifically disclose how a resend control signal for requesting a data resend is transmitted.

According to the DECT (Digital European Cordless Telecommunications) system used for the wireless communication in cordless telephone systems, the transmission and reception are performed on a time division basis, instead of being performed simultaneously so that the interferences between the transmission and reception signals can be avoided. For instance, in an intercom based on the DECT system where an image is transmitted from a slave device to a master device while a two-way voice communication is established between the master device and the slave device, the two communication wireless links for the voice data and the image data are individually controlled so that some time delay is inevitable in establishing a communication link between the master device and the slave device. Also, when a resend control signal for image data is superimposed on the control signal, there is a greater likelihood of corruption in the control signal so that the slave device may experience some difficulty in properly controlling the communication channels by using the control signal, and the speed of transmitting image data could be impaired.

SUMMARY OF THE INVENTION

In view of such problems of the prior art, a primary object of the present invention is to provide a wireless communication method which can increase the speed of transmitting image data without requiring a high processing capability.

According to the present invention, the data that is to be transmitted between the master device and the slave device in a bi-directional communication is transmitted by using a pair of slots which may belong to a same channel, and the data that is to be transmitted between the master device and the slave device in a uni-directional communication is transmitted by using the both slots of one or a plurality of channels so that a maximum amount of data can be transmitted by using a minimum number of channels.

BRIEF DESCRIPTION OF THE DRAWINGS

Now the present invention is described in the following with reference to the appended drawings, in which.

DESCRIPTION OF THE PREFERRED EMBODIMENT(S)

Figure 1:
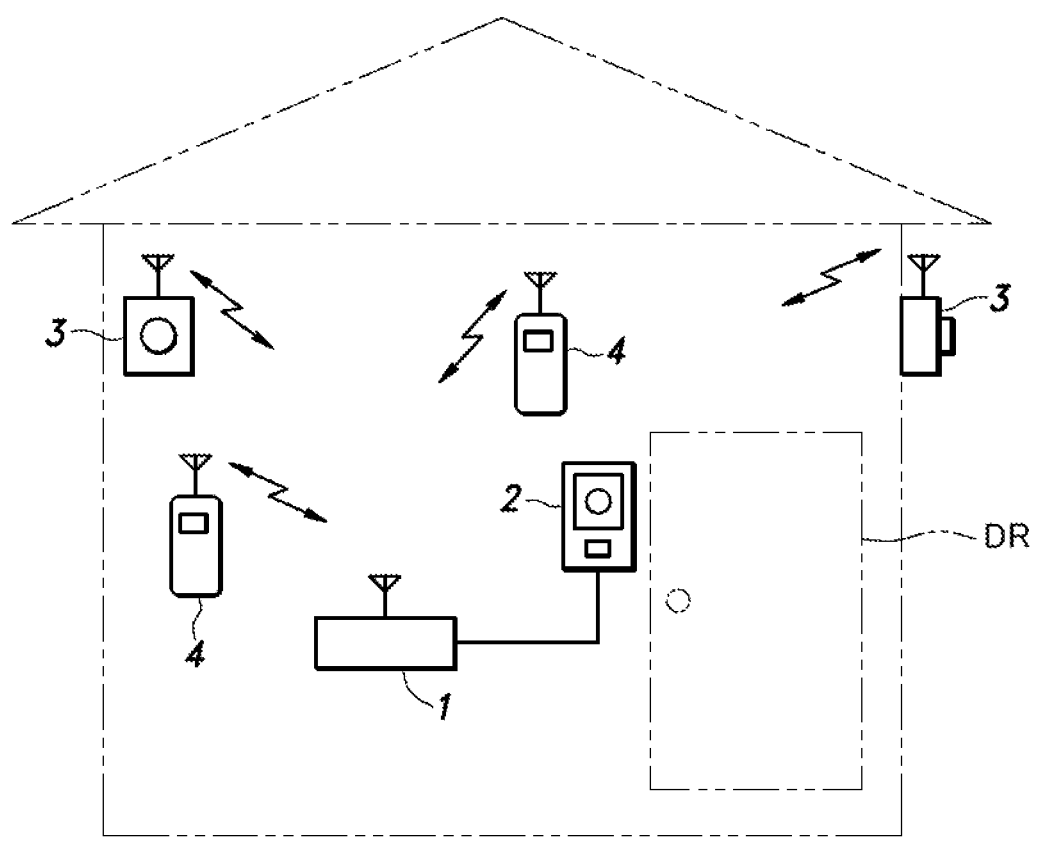
FIG. 1 is a diagram showing the overall structure of a wireless communication system embodying the present invention.

To achieve such an object, the present invention provides a wireless communication method for performing a wireless communication between a master device and a slave device via a wireless link based on a time division method using a plurality of time slots defined along a time axis for each time frame and consisting of a first slot group and a second slot group, each slot in the second slot group being paired to a different one of the slots in the first group, comprising: a bi-directional communication where data is transmitted from the master device to the slave device by using a part of the slots of the first slot group and from the slave device to the master device by using a part of the slots of the second slot group; and a uni-directional communication where data is transmitted from one of the master device and the slave device to the other by using a remaining part of the slots of the first slot group and a remaining part of the slots of the second slot group; wherein a data resend signal is transmitted from one of the master device and the slave device for controlling a resending of data transmitted in the uni-directional communication by using at least one slot selected from the first and second slot groups used for the bi-directional communication.

According to this arrangement, the data to be transmitted in a bi-directional communication is transmitted bi-directionally by using a slot in the first slot group and another slot in the second slot group which may be paired to each other, and the data that is to be transmitted between the master device and the slave device in a uni-directional communication is transmitted by using the both slots of one or a plurality of channels so that a maximum amount of data can be transmitted by using a minimum number of channels when a bi-directional communication and a uni-directional communication are combined in the overall communication.

In particular, when the data transmitted by using one of the slots used for the bi-directional communication includes a resend control signal, the need for a separate channel for the transmission of resend signals can be eliminated, and the necessary number of channels or the amount of necessary resources can be reduced.

The present invention also provides a wireless communication method for performing a wireless communication between a master device and a slave device via a wireless link based on a time division method using a plurality of channels defined for each time frame, each channel being formed by a pair of time slots defined along a time axis and spaced from each other by a prescribed time period, comprising: a bi-directional communication where data is transmitted from the master device to the slave device by using one of the slots of a selected one of the channels, and from the slave device to the master device by using the other slot of the selected channel; and a uni-directional communication where data is transmitted from one of the master device and the slave device to the other by using the slots of remaining channels; one of the slots of the selected channel being used for transmitting a resend control signal for the data transmitted in the uni-directional communication. The data transmitted in the bi-directional communication typically consists of voice data. Thus, the channel used for the bi-directional communication can carry both data and resend control signals.

When a certain channel is not available for use owing to external interferences or other causes of poor wireless connection, the channel may be switched to another one. According to the present invention, in such a situation, it suffices if only one channel is changed to another so that the number of channels that are involved can be minimized, and the countermeasure against external interferences can be achieved in a minimum time so that the communication quality can be improved.

According to a preferred embodiment of the present invention, the data for the bi-directional communication consists of voice data, and the data for the uni-directional communication consists of image data.

According to this arrangement, the voice data can be efficiently processed by using a single channel when performing voice communication between the master device and the slave device, and the both of the paired slots of a single channel can be used in a uni-directional communication such as when transmitting image data from a slave device fitted with a camera unit to the master device.

If desired, a plurality of slave devices may be provided in conjunction with a single master device so that a multi-party communication can be achieved by suitably allocating channels or slots to individual slave devices.

In such a case, when a plurality of slave devices are simultaneously activated for the transmission of image data to the master device, if the voice data is transmitted to the slave devices to the master device, the simultaneous reproduction of the voices from the different slave devices is confusing to the user of the master device. Therefore, only the image data may be transmitted from the slave devices to the master device, and one of paired slots of a certain channel may be used for the transmission of resend control signals while the other of the paired slots of this channel may be used for the transmission of image data. As a result, the transmission capacity of the image data can be increased without actually increasing the number of channels that are used.

According to a preferred embodiment of the present invention, the slave device comprises a camera slave device placed for the monitoring of the exterior of a house or the like or a monitor slave device which may be portable so that the present invention may be favorably applied to a home door phone system.

According to another aspect of the present invention, the present invention provides a wireless communication method for performing a wireless communication between a master device and a slave device via a wireless link based on a time division method using a plurality of channels defined for each time frame, each channel being formed by a pair of time slots defined along a time axis and spaced from each other by a prescribed time period, comprising: a bi-directional communication where data is transmitted from the master device to the slave device by using a first communication channel selected from the channels, and from the slave device to the master device by using the other slot of the first communication channel; and a uni-directional communication where data is transmitted from one of the master device and the slave device to the other by using the slots of remaining channels; wherein the data transmitted from the master device to the slave device includes a control data field containing an activation command for a second communication channel selected from the remaining channels, and the slave device is configured to look for a vacant channel such that when the slave device has determined that a second communication channel designated by the master device is available for use, the slave device transmits a channel notification signal indicating slots and frequencies that are to be used for the second communication channel by using the first communication channel.

In this case, the second communication channel may be used for a uni-directional communication from one of the master device and the slave device to the other.

DESCRIPTION OF THE PREFERRED
EMBODIMENT(S)

FIG. 1 is a diagram showing the overall structure of a wireless communication system embodying the present invention. A master device 1 is placed in a house, a door phone slave device 2 is placed on the exterior of a door DR to the house or an adjacent part of the exterior of the house, a pair of camera slave devices 3 are placed on the exterior of the house to monitor the outside of the house, and a pair of portable monitor slave devices 4 are placed in the house mostly for use inside the house. The camera slave devices 3 are typically attached to the outer wall of the house.

Figure 2:
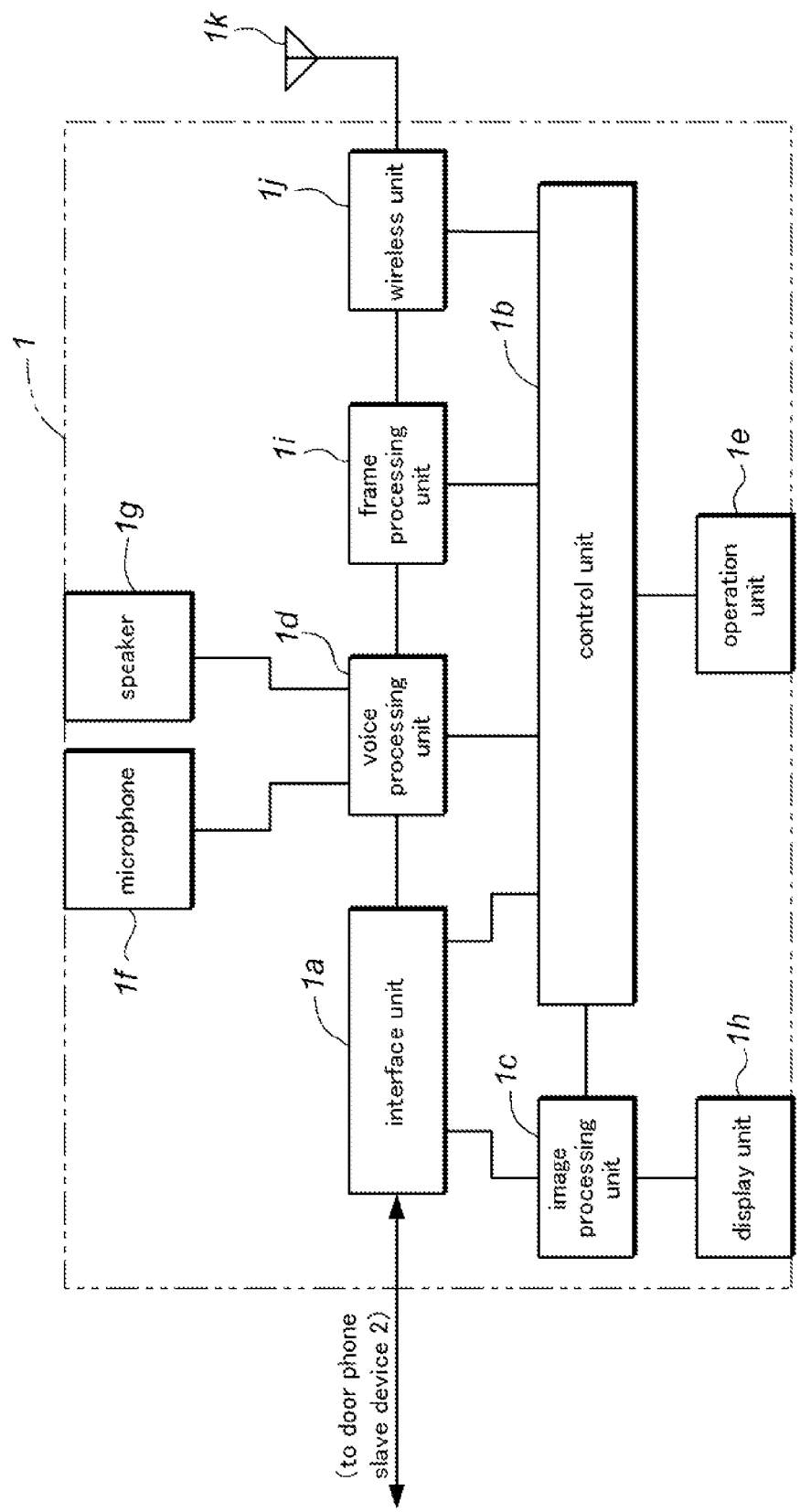
FIG. 2 is a block diagram showing the structure of a master device.

FIG. 2 is a block diagram showing the structure of the master device 1. The master device 1 is provided with an interface unit 1a for exchanging signals with the door phone slave device 2 via wire, and a control unit 1b connected to the interface unit 1a to control the overall operation of the master device 1. If desired, the communication between the master device 1 and the door phone slave device 2 may also be performed via a wireless link.

The master device 1 further comprises an image processing unit 1c connected to the control unit 1b and the interface unit 1a, a voice processing unit 1d connected to the control unit 1b and the interface unit 1a, and an operation unit 1e connected to the control unit 1b to transmit commands entered from button switches of the master device 1 to the control unit 1b. The voice processing unit 1d of the master device 1 is connected to a microphone if and a speaker 1g, and the image processing unit 1c is connected to a display unit 1h typically including an LCD panel. The master device 1 further comprises a frame processing unit 1i connected to the control unit 1b and the voice processing unit 1d, and a wireless unit 1j connected to the frame processing unit 1i and the control unit 1b. An aerial antenna 1k for wireless communication is connected to the wireless unit 1j.

Figure 3:
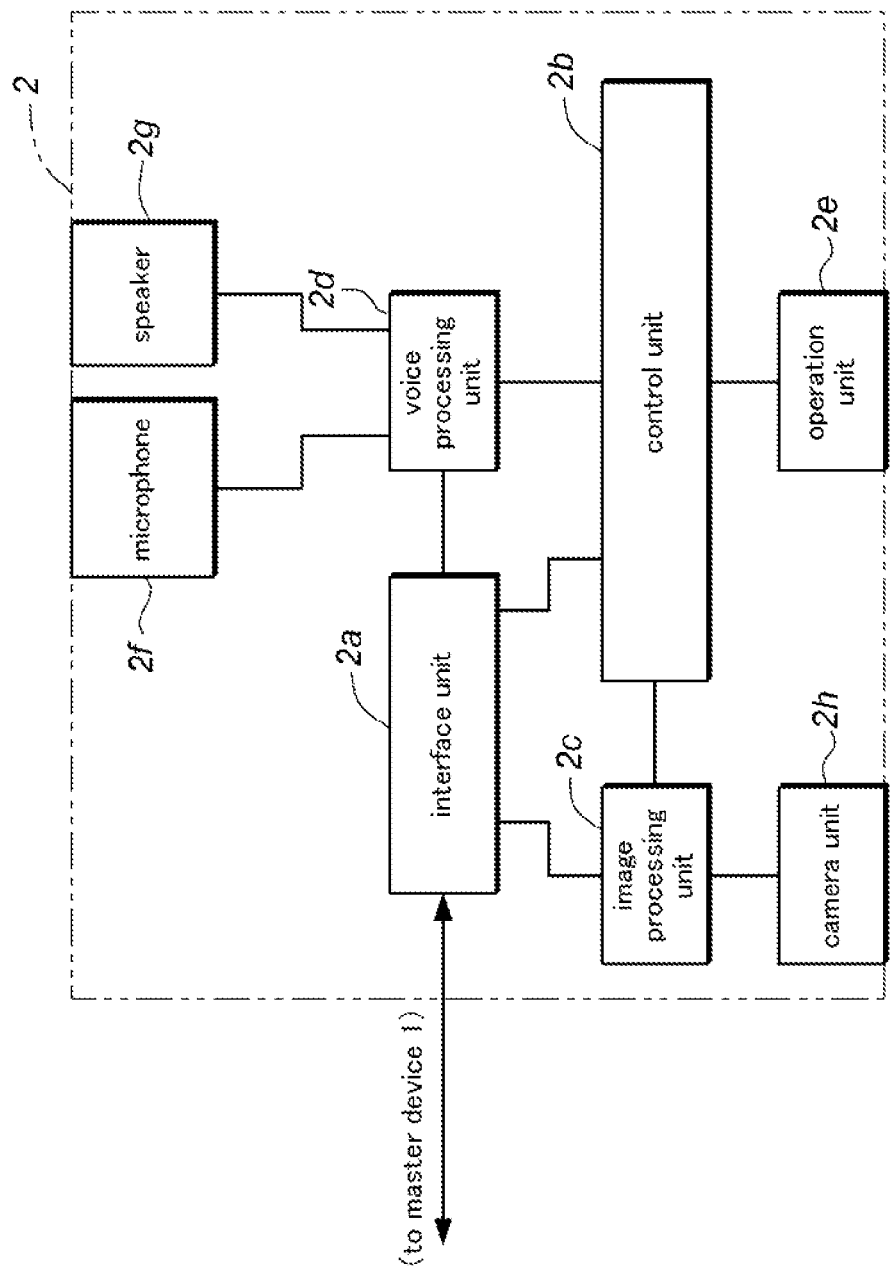
FIG. 3 is a block diagram showing the structure of a door phone slave device.

FIG. 3 is a block diagram showing the structure of the door phone slave device 2. The door phone slave device 2 comprises an interface unit 2a for exchanging signals with the master device 1 via wire in the illustrated embodiment, a control unit 2b connected to the interface unit 2a and responsible for overall control of the door phone slave device 2, an image processing unit 2c connected to the interface unit 2a and the control unit 2b, a voice processing unit 2d connected to the interface unit 2a and the control unit 2b, and an operation unit 2e connected to the control unit 2b to transmit commands entered from button switches of the door phone slave device 2 to the control unit 2b. The voice processing unit 2d of the door phone slave device 2 is connected to a microphone 2f and a speaker 2g, and the image processing unit 2c is connected to a camera unit 2h for capturing the image on the outside of the door DR.

Figure 4:
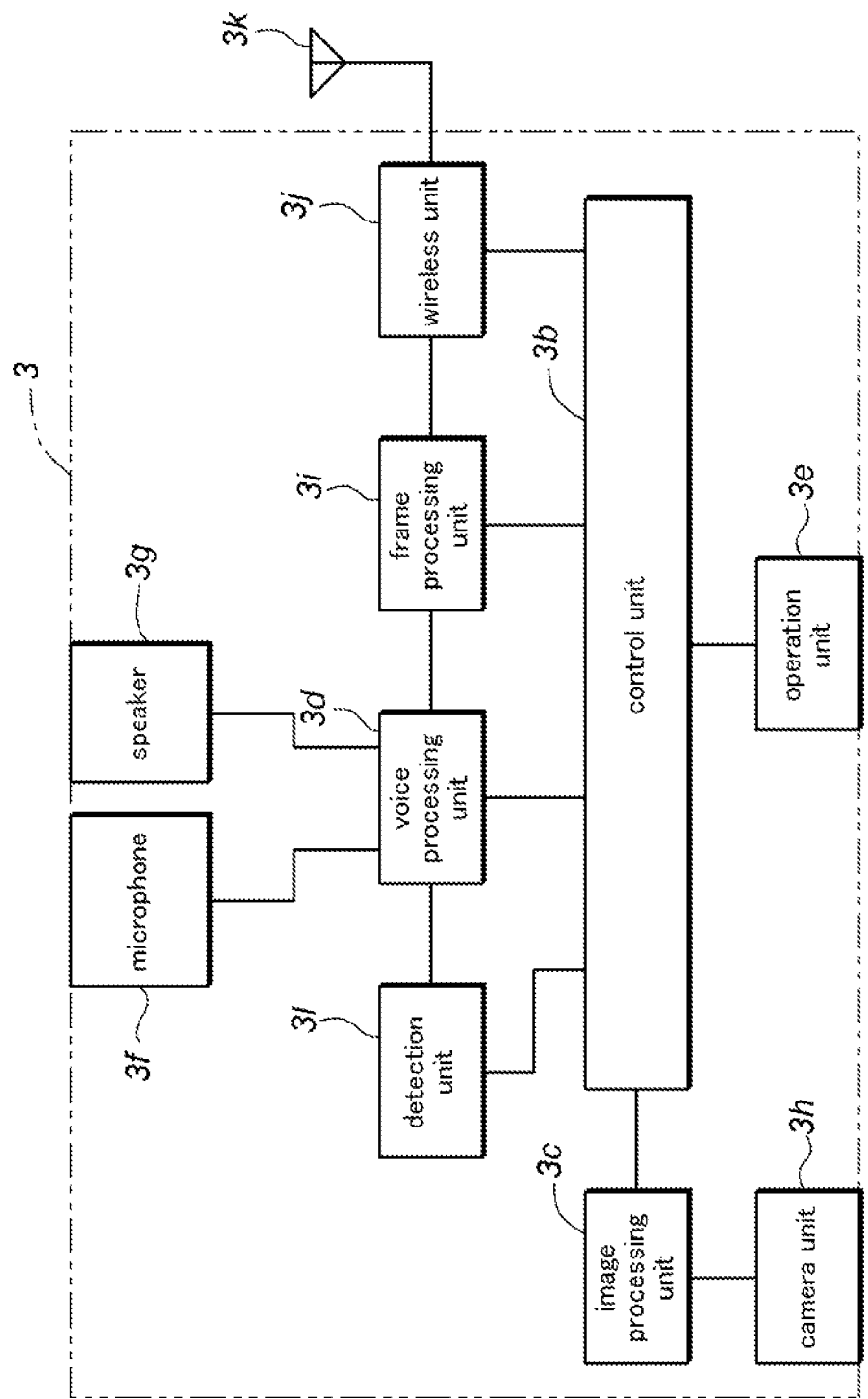
FIG. 4 is a block diagram showing the structure of a camera slave device.

The two camera slave devices 3 may be similarly constructed, and FIG. 4 is a block diagram showing the structure of one of the camera slave devices 3. The camera slave device 3 comprises a control unit 3b responsible for the overall control of the camera slave device 3, an image processing unit 3c connected to the control unit 3b, a voice processing unit 3d connected to the control unit 3b and an operation unit 3e connected to the control unit 3b to transmit commands entered from button switches (not shown in the drawings) of the camera slave device 3 to the control unit 3b.

The voice processing unit 3d of the camera slave device 3 is connected to a microphone 3f and a speaker 3g, and the image processing unit 3c is connected to a camera unit 3h for capturing the image on the outside of the house. The camera slave device 3 further comprises a frame processing unit 3i connected to the control unit 3b and the voice processing unit 3d, and a wireless unit 3j connected to the frame processing unit 3i and the control unit 3b. An aerial antenna 3k for wireless communication is connected to the wireless unit 3j. Additionally, the control unit 3b of the camera slave device 3 is connected to a detecting unit 3l including a human sensor that may consist of an infrared sensor.

Figure 5:
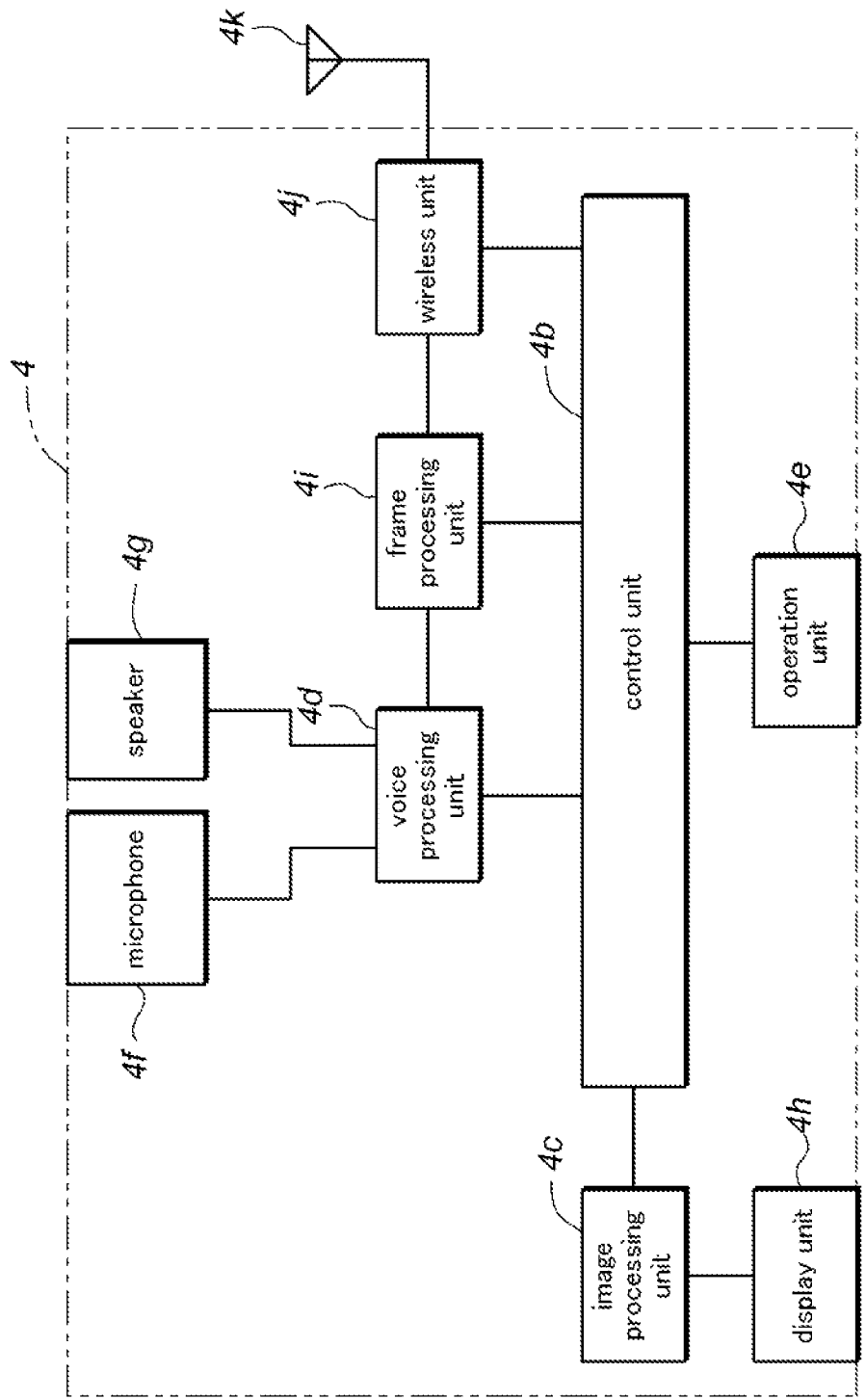
FIG. 5 is a block diagram showing the structure of a monitor slave device.

The two monitor slave devices 4 may be similarly constructed, and FIG. 5 is a block diagram showing the structure of one of the monitor slave devices 4. The monitor slave device 4 comprises a control unit 4b responsible for the overall control of the monitor slave device 4, an image processing unit 4c connected to the control unit 4b, a voice processing unit 4d connected to the control unit 4b and an operation unit 4e connected to the control unit 4b to transmit commands entered from button switches of the monitor slave device 4 to the control unit 4b.

The voice processing unit 4d of the monitor slave device 4 is connected to a microphone 4f and a speaker 4g, and the image processing unit 4c is connected to a display unit 4h typically including an LCD panel. The monitor slave device 4 is further provided with a frame processing unit 4i connected to the control unit 4b and the voice processing unit 4d, and a wireless unit 4j connected to the frame processing unit 4i and the control unit 4b. An aerial antenna 4k for wireless communication is connected to the wireless unit 4j.

The mode of controlling the wireless communication in this wireless communication system is described in the following.

Figure 6:
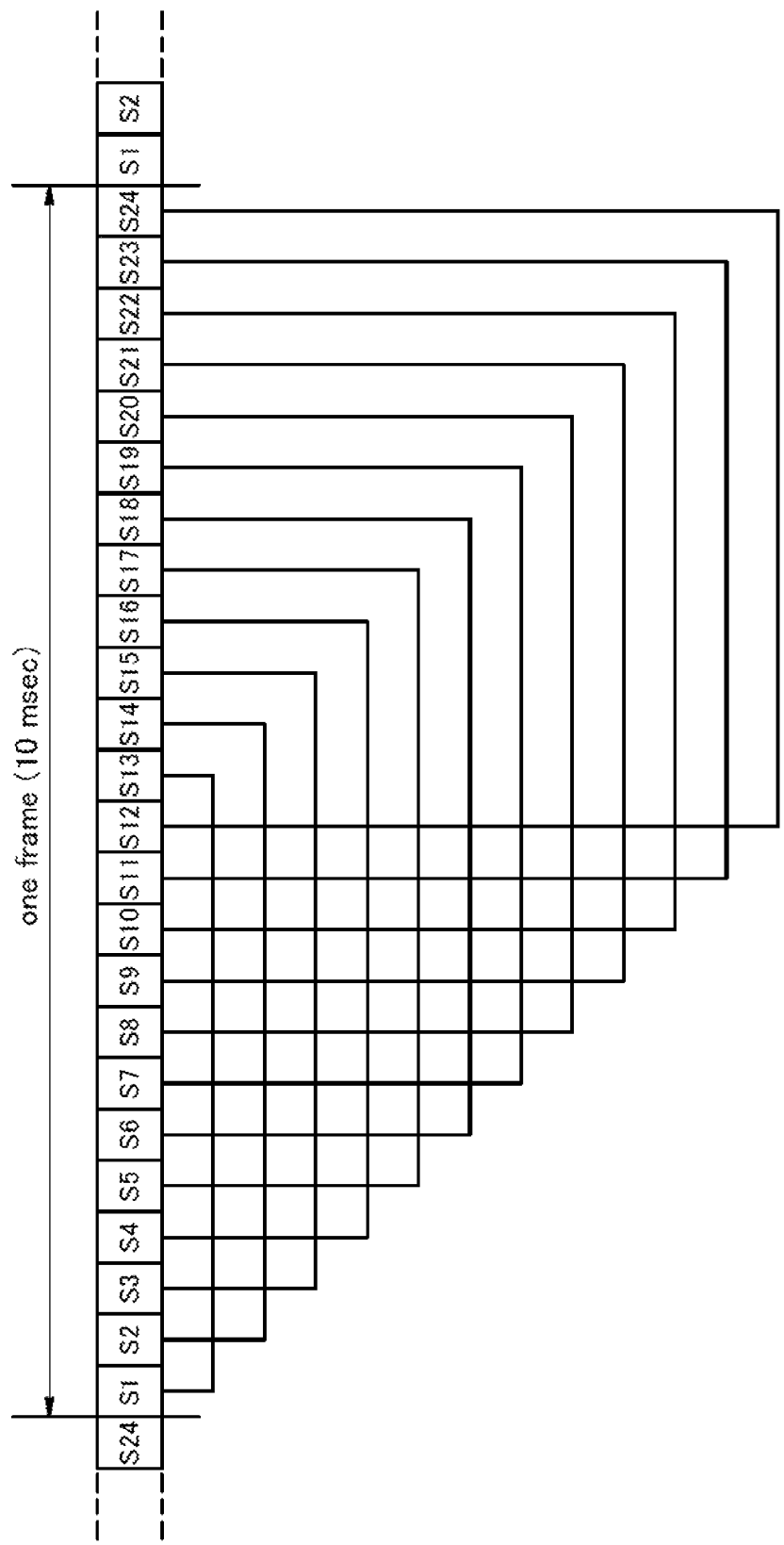
FIG. 6 is a diagram showing the structure of a frame in the time division multiple access (TDMA) system according to the present invention.

FIG. 6 is a diagram showing the structure of a frame in a time division multiple access (TDMA) communication according to the present invention. This communication is performed between the master device 1 and each of the slave devices 3 and 4. In the illustrated embodiment, each frame is transmitted at the interval of 10 msec, for instance, according to the domestic DECT (Digital Enhanced Cordless Telecommunications) standard which is based on the standard developed by ETSI (European Telecommunications Standards Institute). Each frame consists of 24 slots (S1 to S24).

In the illustrated embodiment, of the 24 slots, the first 12 slots are grouped as a first slot group, and the remaining 12 slots are grouped as a second slot group, and each slot in the first slot group is paired with a different one of the slots in the second slot group, and each paired slots form a communication channel. In particular, the positions of the paired slots in the first and second slot groups are the same with each other so that the two slots of each channel are separated by 5 msec. For instance, slot S1 and slot S13 form a channel, slot S2 and slot S14 form a next channel, and so forth.

Figure 7:
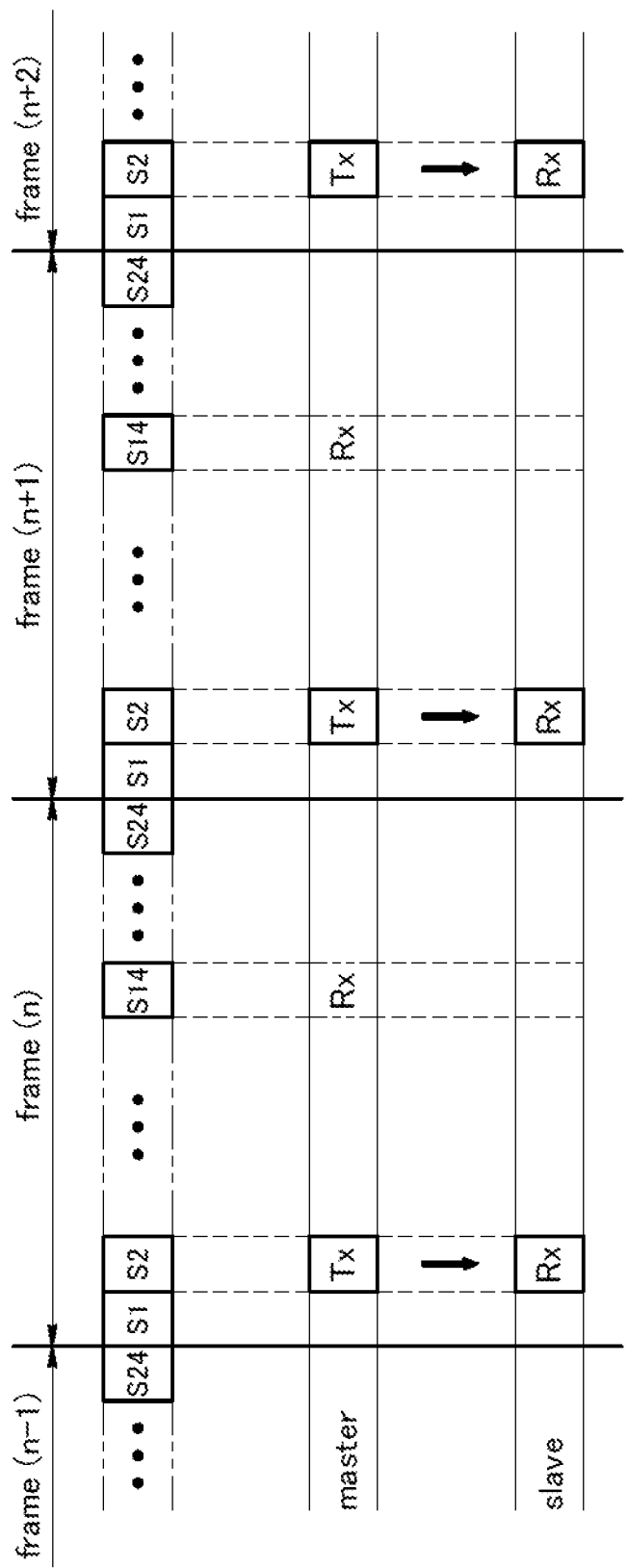
FIG. 7 is a diagram showing the functions of transmission and reception slots when transmitting data from the master device to the slave device.

FIG. 7 shows the functions of the transmission and reception slots of the control channels that are used for transmitting control signals to the door phone slave device 2 (or the camera slave device 3 or the monitor slave device 4). As shown in this diagram, one of the slots (S2 in this case) is allocated as a control channel in each frame, and control information of various kinds is constantly transmitted from the master device 1 by using this control channel. For instance, this control channel may be used for transmitting the identification information of the master device 1 (master device ID), the slot number that is being used, control information for synchronizing the time division multiple access communication between the corresponding slave device 2, 3, 4 and the master device 1, a call information or a control information for starting a communication between the master device 1 and the slave device 2, 3, 4.

All of the slave devices 2, 3 and 4 receive signals from the master device 1 via the control channel, and synchronize with the frame/slot timing of the master device 1. The master device 1 receives signals via slot S14 which is spaced from the slot S2 serving as the control channel by a prescribed time period to monitor if the frequency used for the transmission via the control channel is already being used by any other wireless device (the presence of interfering signals). The transmission slot of the control channel is S2, and the corresponding reception slot is S14 in the embodiment illustrated in FIG. 7, but other slots may also be used without departing from the spirit of the present invention.

Figure 8:
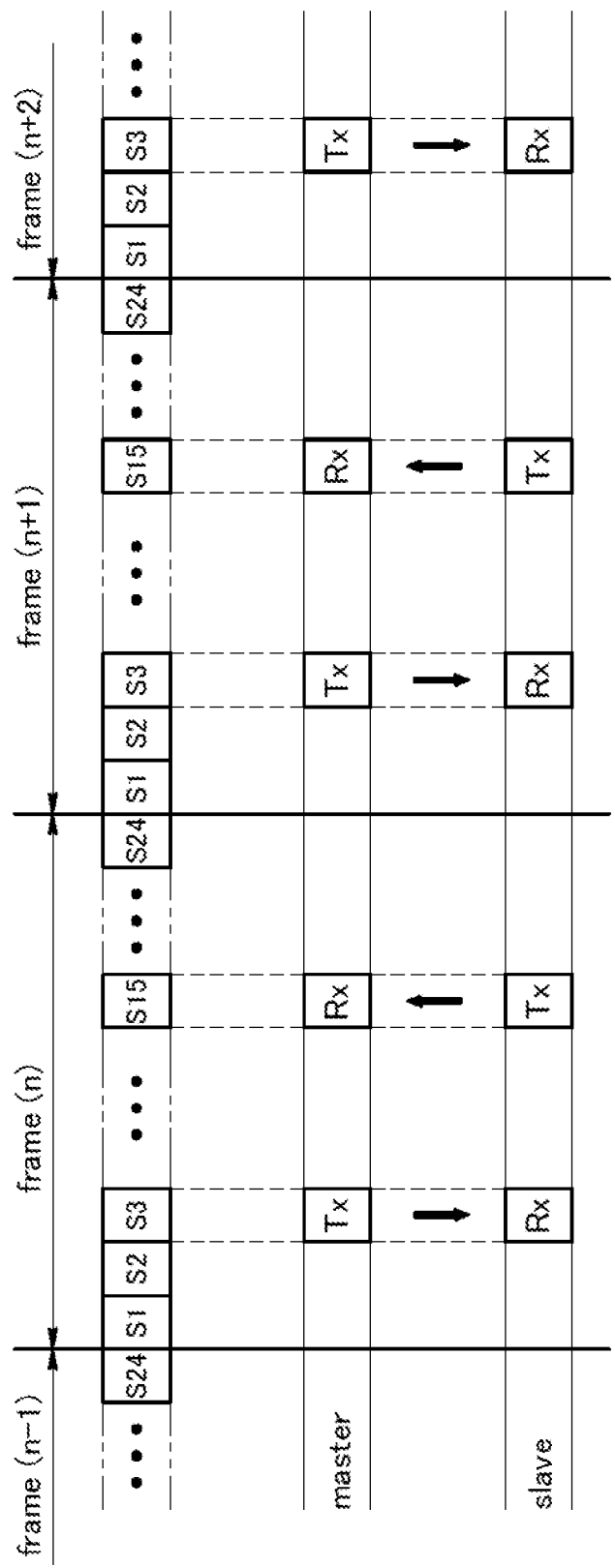
FIG. 8 is a diagram showing the functions of transmission and reception slots when performing a two-way communication between the master device and the slave device.

FIG. 8 is a diagram showing the functions of transmission and reception slots when performing a two-way communication (bi-directional communication) between the master device 1 and the slave device 2, 3, 4. The communication channel for this two-way communication consists of slot S3 and slot S15 which is spaced from slot S3 by 5 msec. In this manner, in each frame, two slots which are spaced by one half of the length (time period) of each frame form a communication channel. In FIG. 8, a two-way communication channel is formed by two slots such that the master device 1 transmits data to the slave device 2, 3, 4 via one of the slots S3 and the slave device transmits data to the master device 1 via the other slots S15. In this two-way communication channel, when the master device 1 transmits data to the slave device via one of the paired slots, the master device 1 can receive data from the slave device via the other of the paired slots.

Figure 9:
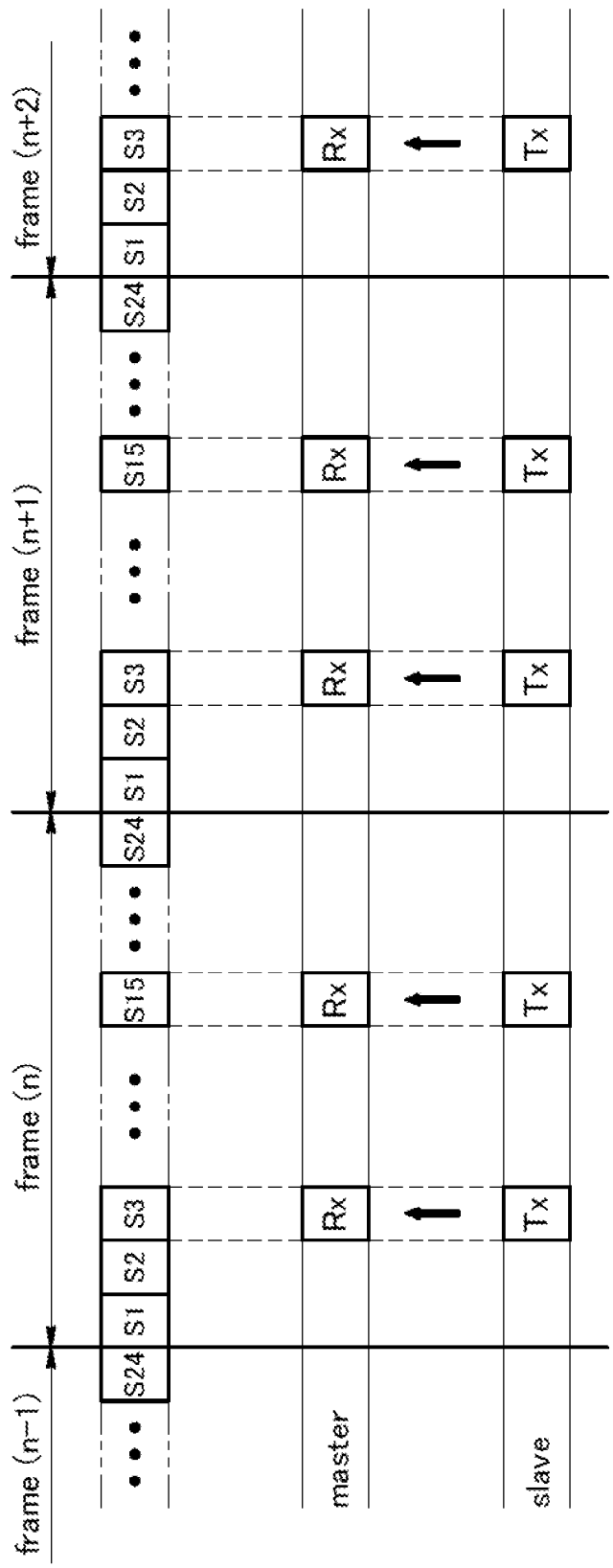
FIG. 9 is a diagram showing the functions of transmission and reception slots when performing a one-way communication from the slave device to the master device.

FIG. 9 is a diagram showing the functions of transmission and reception slots when performing a one-way communication (uni-directional communication) from the slave device 2, 3, 4 to the master device 1. The communication channel for this one-way communication consists of slot S3 and slot S15 which is spaced from slot S3 by 5 msec so that the data is transmitted from the slave device to the master device 1 by using the two slots S3 and S15. In this manner, in each frame, two slots (such as S3 and S15, S4 and S16, S5 and S17, and so forth) which are spaced by one half of the length (time period) of each frame are used for transmitting data from the slave device to the master device 1.

Figure 10:
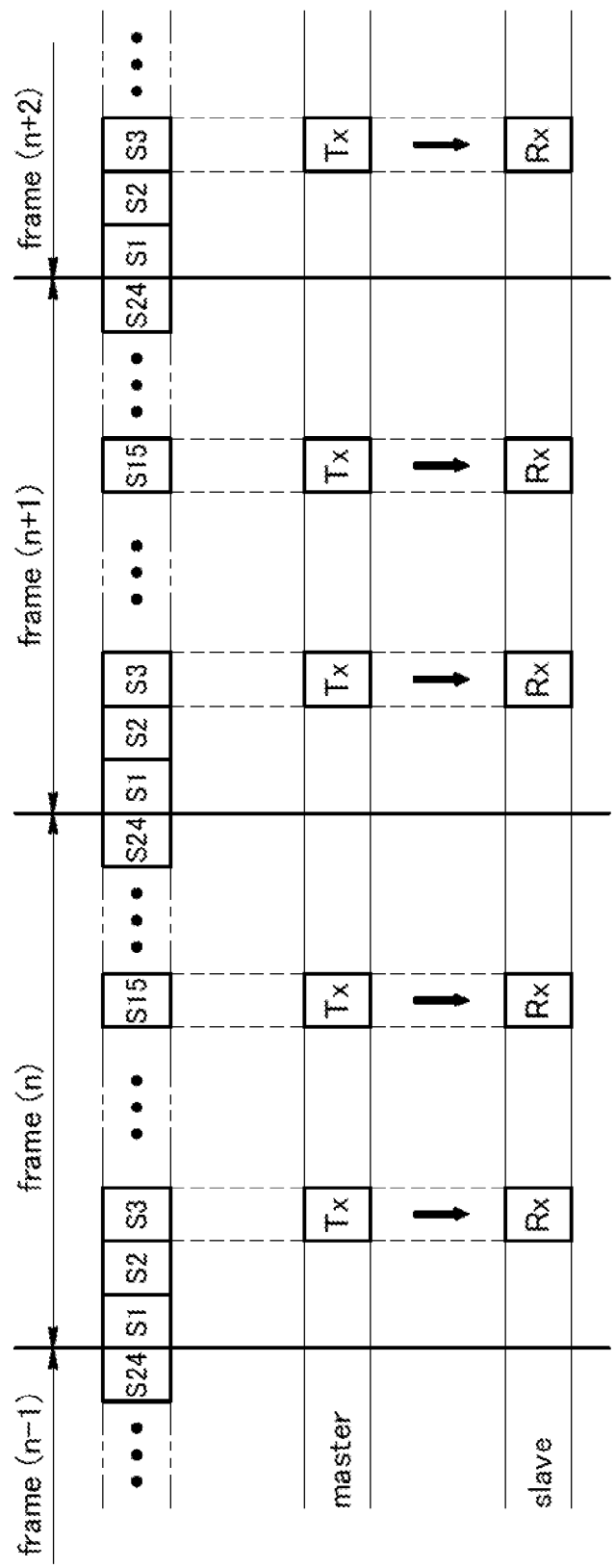
FIG. 10 is a diagram showing the functions of transmission and reception slots when performing a one-way communication from the master device to the slave device.

FIG. 10 is a diagram showing the functions of transmission and reception slots when performing a one-way communication from the master device 1 to one of a plurality of slave devices 2, 3, 4. Similarly as in FIG. 9, the communication channel for this one-way communication consists of slot S3 and slot S15 which is spaced from slot S3 by 5 msec so that the data is transmitted from the master device 1 to the slave device by using the two slots S3 and S15. In this manner, in each frame, two slots (such as S3 and S15, S4 and S16, S5 and S17, and so forth) which are spaced by one half of the length (time period) of each frame are used for transmitting data from the master device 1 to the slave device. In this case, only the slave device (or slave devices) that is (are) in synchronism with the master device 1 can receive data.

Based on the modes of data transmission and reception shown in FIGS. 7 to 10, for instance, the image data captured by the door phone slave device 2 is transmitted to the master device 1, and the image data is then transmitted from the master device 1 to the slave devices 3 and 4 so that the image data may be displayed on the monitor slave devices 4 on the respective monitor screens.

Figure 11A:
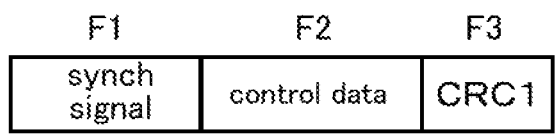
FIG. 11 is a diagram showing the field structures of a control channel (a) and a communication channel (b)
Figure 11B:
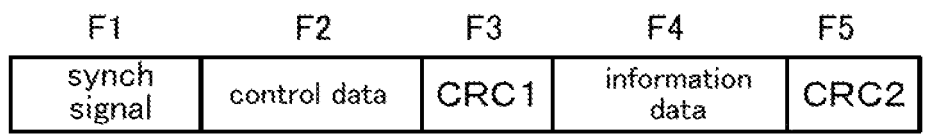

FIG. 11 is a diagram showing the field structures of a control channel and a communication channel that are used in the TDMA communication according to the present invention, and essentially shows the contents of the individual slots. (a) in FIG. 11 shows the field structure of the control channel which is used for transmitting signals for resend control between the master device 1 and the corresponding monitor slave device 4 in a state where a signal is not being received from any of the door phone slave devices 2 and the camera slave devices 3 (signal non-receiving state) and a state where a signal is being received from any of the door phone slave devices 2 and the camera slave devices 3 (signal receiving state). (b) in FIG. 11 shows the field structure of the communication channel. This field structure is used for the slot for use in the control channel and the slot for transmitting the voice signal and/or the image signal when a signal from any one of the door phone slave devices 2 and the camera slave devices 3 is being received.

The field structure shown in (a) of FIG. 11 includes a synch signal field F1, a control data field F2 and a CRC1 field F3. The synch signal field F1 consists of a data string for bit synchronization and a data string for slot synchronization. The control data field F2 includes a frame for TDMA communication and control data consisting of such signals as those for slot synchronization and for calling any one of the slave devices 2 to 4. The CRC1 field F3 contains data for error detection corresponding to the data string of the control data field to detect any error in the control data field. The CRC1 field F3 may be followed by an information data field containing voice data and/or image data.

The field structure shown in (b) of FIG. 11 includes a synch signal field F1, a control data field F2, a CRC1 field F3, an information data field F4 and a CRC2 field F5. As mentioned above, this field structure is used when receiving a signal from any one of the door phone slave devices 2 and the camera slave devices 3, and the control data field F2 may contain such data as the control data for activating and ending a communication channel or a service, and the control data for resend control data in data communication. The information data field F4 may contain voice data, image data and resend control data.

Figure 12:
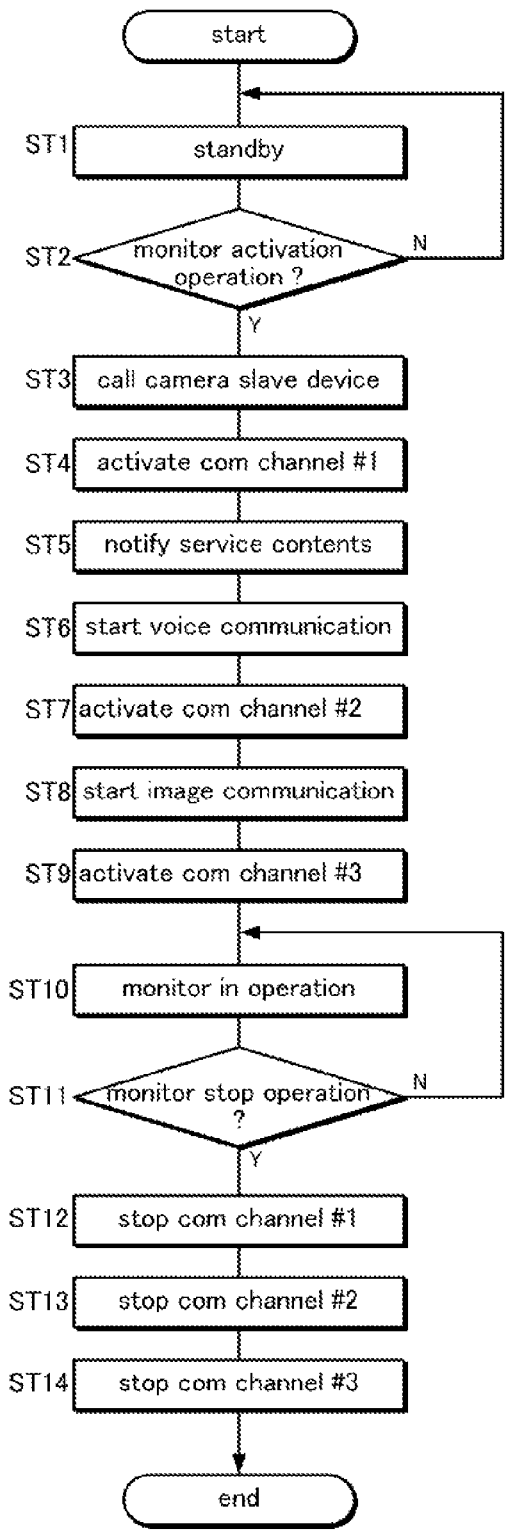
FIG. 12 is a flowchart of the control process when activating a monitor of a camera slave device.

FIG. 12 is a flowchart of the control process when activating the monitor of the master device 1 for viewing an image transmitted from a camera slave device 3. The camera slave device 3 is in a standby condition in step ST1 waiting for a signal from outside, and determines if an activation signal is received from the master device 1 in step ST2. The master device 1 performs an activation operation for the camera slave device 3 via the operation unit 1e thereof so that the communication channel for data communication and voice communication with the camera slave device 3 is activated, and the image data transmitted from the camera slave device 3 is displayed on the monitor screen of the display unit 1h. The image data from the camera slave device 3 may consist of QVGA jpeg image data which is transmitted at the rate of one image frame per second.

When no activation signal is received from the master device 1 in step ST2, steps ST1 and ST2 are repeated until an activation signal is received from the master device 1. Once an activation signal is received, the program flow advances to step ST3 to perform a calling process for the camera slave device 3.

Figure 13:
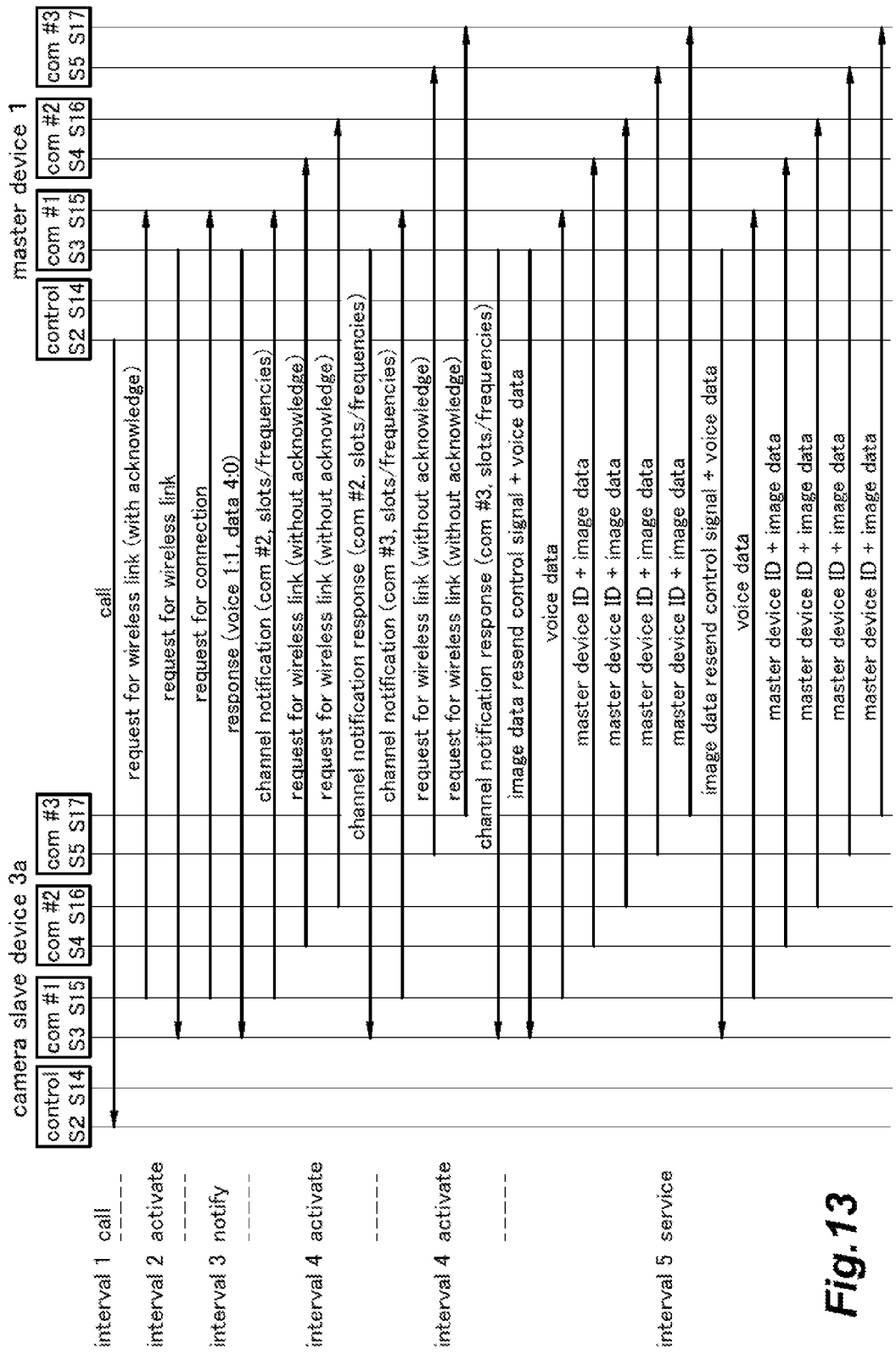
FIG. 13 is a sequence diagram of activating the monitor of the camera slave device and data transmission from the camera slave device.

FIG. 13 is a sequence diagram of the process of activating the image monitoring by the camera slave device and the data transmission from the camera slave device. In FIG. 13, each phase of the control process that is carried out between one of the camera slave devices 3a and the master device 1 is shown in a time series which progresses from top to bottom. The control channel of each of the master device 1 and the camera slave device 3a may be as shown in (a) of FIG. 11, and each communication channel may be as shown in (b) of FIG. 11, In each instance, it is assumed that a required synchronization is achieved.

Figure 14:
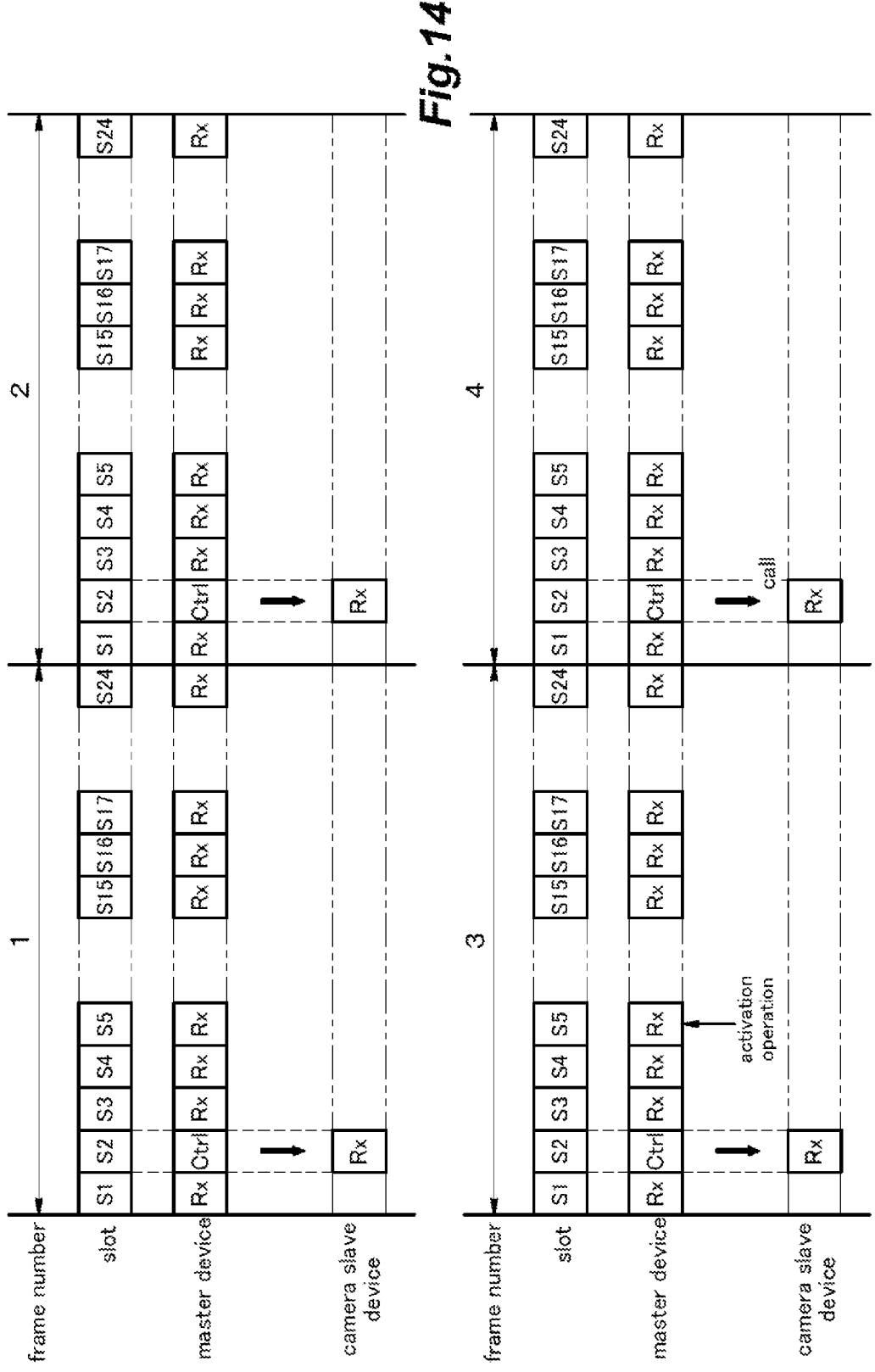
FIG. 14 is a diagram showing the functions of transmission and reception slots in a calling phase at the time of activating the monitor of the camera slave device.

FIG. 14 is a diagram showing the functions of transmission and reception slots in a calling phase at the time of activating the monitoring operation of the camera slave device 3a. The change in the frames is indicated by consecutive integers starting from value 1. Frames 1 and 2 in FIG. 14 correspond to a standby condition of the camera slave device 3a. In this standby condition, the camera slave device 3a receives a signal from the master device 1 via a control channel, and awaits a call signal from the master device 1 while maintaining a frame/slot synchronism with the master device 1. The master device 1 transmits a control signal containing such information as the master device ID and the slot number used for the transmission via slot S2 in each frame. In the standby condition, the master device 1 performs a reception process via the remaining 23 slots in each frame, excluding slot S2 for transmitting a control signal, and awaits the reception of a request signal for establishing a wireless communication link from a camera slave device 3 or a monitor slave device 4, and monitors the presence of any interfering signal in the communication frequencies used in these slots.

When an activation operation of the monitoring by the camera slave device 3a is made in the master device 1 during steps ST1 and ST2 of the program flow, the operation unit 1e receives a camera monitoring activation operation signal produced by the pressing of an activation button provided on the master device 1 via an arbitrary available slot that is not used for control channel transmission as shown in frame 3 of FIG. 14. Then, as a calling phase of interval 1 in FIG. 13, the master device 1 transmits a control channel signal including a camera slave device call signal by using slot S2 as shown in frame 4 of FIG. 14, and this call signal is received by the camera slave device 3a. In this case, a pair of slots S2 and D14 can be allocated to the control channel, but in the illustrated embodiment, only one of the slots S2 is used.

In step ST4, the camera slave device 3a executes a phase for activating a first communication channel (communication channel #1: com #1) as a two-way communication channel. This corresponds to the first communication channel activating phase in interval 2 of FIG. 13.

Figure 15:
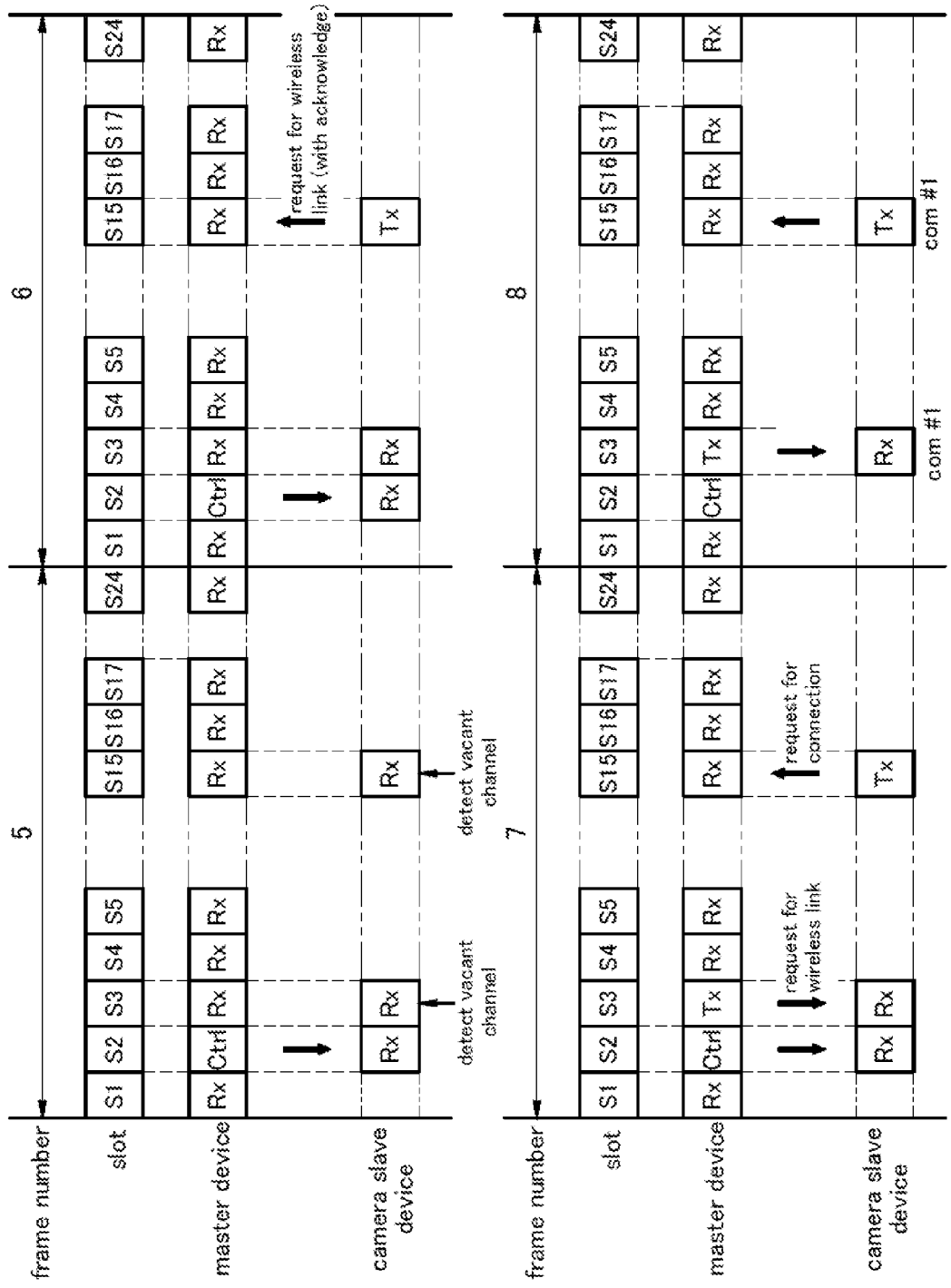
FIG. 15 is a diagram showing the functions of transmission and reception slots when activating a first communication channel of the camera slave device.

FIG. 15 is a diagram showing the functions of transmission and reception slots when activating the first communication channel of the camera slave device 3a. In frame 5, it is determined if the slot adjacent to the slot used for the control channel such as slot S3 and corresponding slot S15 are available for use as a vacant channel in frame 5. If it is determined that slots S3 and S15 are under the influences of external interferences, other slots are looked for as a vacant channel.

In FIG. 15, it is determined that slots S3 and S15 are available so that the camera slave device 3a transmits a request signal for the establishment of a wireless link to the master device 1 by using slot S15, for instance. Once the establishment of a wireless link is detected in frame 7, the master device 1 transmits an acknowledge signal for the establishment of a wireless link to the camera slave device 3a by using slot S3 corresponding to slots S15 used in frame 6.

In step ST5, upon receipt the acknowledge signal for the establishment of a wireless link from the master device 1, the camera slave device 3a executes a service notifying phase in interval 3 of FIG. 13. In this interval, as shown in frame 7, the camera slave device 3a transmits a connection request signal to the master device 1 via slot S15 corresponding to slot S3. The first communication channel (slots S3 and S15) is used for the notification of the service contents in interval 3. In other words, as shown in frame 8 of FIG. 15, the master device 1 transmits a response signal to the camera slave device 3a to command the voice signal and the data signal to be transmitted in 4:0 and 1:1 slot configurations, respectively. Upon receipt of the response signal, the camera slave device 3a starts preparing wireless resources such that the voice signal may be communicated as a 1:1 two-way communication, and the data signal may be communicated as 4:0 one-way communication. As a result, the first communication channel consists of a bi-directional channel where the uplink consists of voice signals while the downlink consists of resend control and voice signals.

If external interferences are detected in the communication channel (slots and frequencies) used for receiving a request for the establishment of a wireless link, the master device 1 does not transmit an acknowledge signal for the establishment of a wireless link. Upon failure to receive an acknowledge signal for the establishment of a wireless link, the camera slave device 3 starts the detection of a vacant channel from the beginning after changing the slot and/or the frequency.

According to the result of the exchange of signals concerning the establishment of a wireless link between the camera slave device 3a and the master device 1 in step ST5, the voice communication is started in step ST6. In other words, as shown in the service notification phase in interval 3 and frame 8 of FIG. 15, as the master device 1 has commanded the voice communication to be performed as 1:1 communication, the communication via the first communication channel is started as a 1:1 two-way communication of voice signals between the camera slave device 3a and the master device 1. The 1:1 communication of voice signals means that the voice communication between the master device 1 and the camera slave device 3a is performed by using one slot for each way.

From frame 8 onward, the communication via the control channel using slot S2 as shown in (a) of FIG. 11 is terminated, and the first communication channel (communication channel #1: com #1) as shown in (b) of FIG. 11 is used. In the first communication channel, the control data field contains an ID and an activation phase command for a second communication channel (communication channel #2: com #2) similarly as the control channel, and the information data field contains voice data. The camera slave device 3a transmits signals to the master device 1 via the first communication channel using slot S15 corresponding to slot S3.

Figure 16:
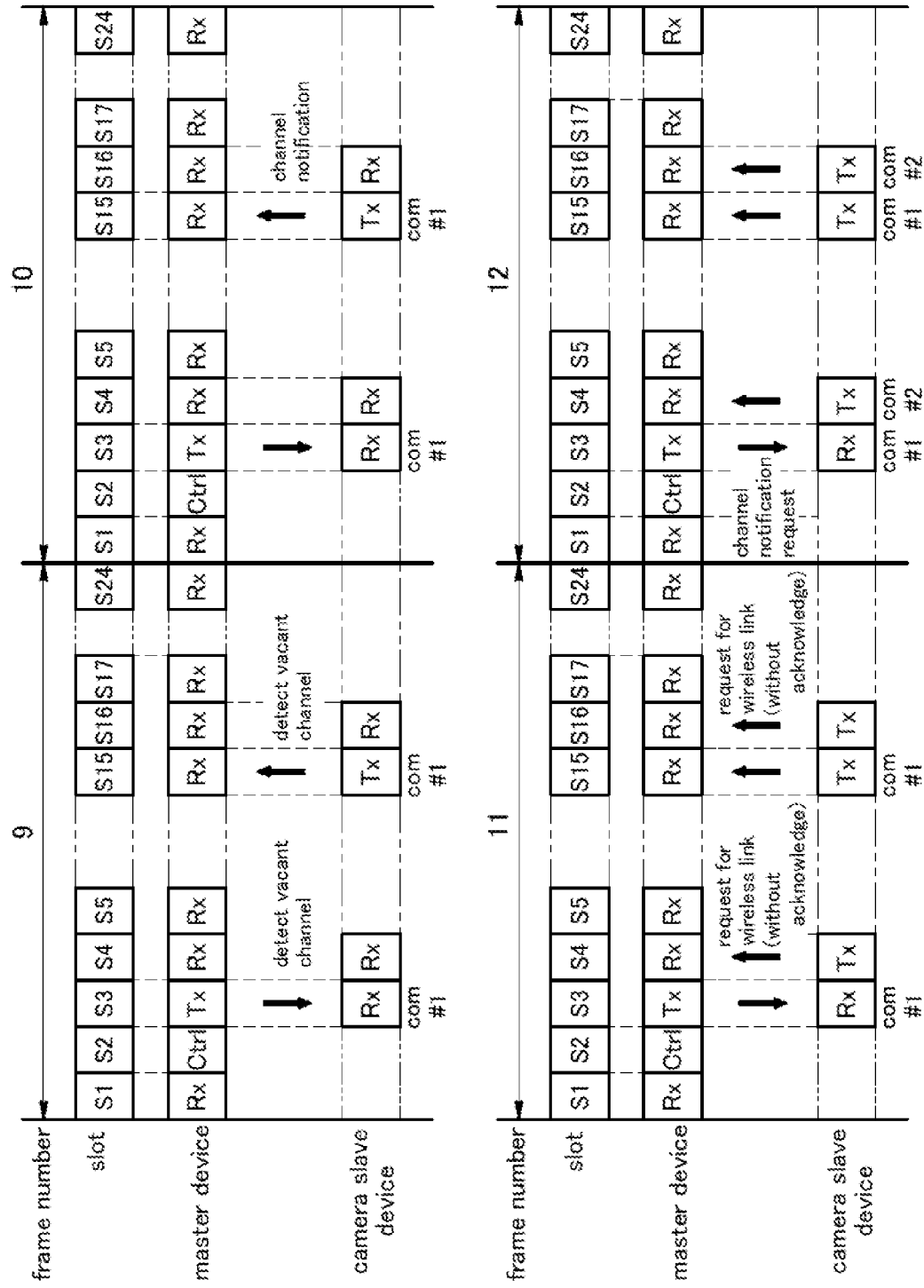
FIG. 16 is a diagram showing the functions of transmission and reception slots when activating a second communication channel of the camera slave device.

In step ST7, the second communication channel (communication channel #2: com #2) is activated. FIG. 16 is a diagram showing the functions of transmission and reception slots when activating the second communication channel of the camera slave device 3a. This corresponds to the operation in the upper part of interval 4 shown in FIG. 13. In frame 9, the camera slave device 3a looks for a vacant channel. A vacant channel can be found by looking for slots (such as slots S4 and S16) following those that have been used (such as slots S3 and S15) in the illustrated embodiment.

The transmission and reception of image data are started in step ST8. Once slots S4 and S16 have been detected as vacant, by using slot S15 corresponding to S3 in frame 10, the camera slave device 3a transmits to the master device 1a channel notification signal that contains information on the slots (S4 and S16) that are to be used for the second communication channel and the corresponding frequencies.

In frame 11, via slots S4 and S16 that have been determined to be vacant, the camera slave device 3a transmits a request signal for the establishment of a wireless link to the master device 1. This request signal for the establishment of a wireless link is transmitted without requiring an acknowledgement.

Upon receiving a request signal for the establishment of a wireless link via slots S4 and S16, the master device 1 transmits to the camera slave device 3a a notification response signal which contains information on the slots (S4 and S16) that are to be used for the second communication channel and the corresponding frequencies in frame 12 via the first communication channel (slot S3) which allows two-way communication.

In the example of FIG. 16, as the two slots of the second communication channel are configured for one-way communication, image data is transmitted from the camera slave device 3a to the master device 1 via two slots (slots S4 and S16). In this case, as there is no data transmission in the opposite direction or from the master device 1 to the camera slave device 3a, the slot notation of the communication channel is 2:0.

Meanwhile, the transmission of the channel notification signal (on the slots and frequencies of the second communication channel) from the camera slave device 3a via slot S15 and the request signal for the established of a wireless link via slots S4 and S16 is maintained.

Thus, the communication via the second communication channel for transmitting image data from the slave device 3a to the master device 1 is enabled as a one-way communication via the two slots S4 and S16.

When external interferences are detected in the slots and frequencies of the second communication channel designated by the channel notification signal transmitted from the camera slave device 3a, the master device 1 transmits a channel notification response refusal signal in the succeeding frame (frame 11 in FIG. 16). Upon receipt of the channel notification response refusal signal or failure to receive a channel notification response signal within a prescribed time period from the time of transmitting the request signal for the establishment of a wireless link, the camera slave device 3a changes the slots and/or the frequencies from those designated by the channel notification signal, and starts the process of detecting a vacant channel from the beginning.

Figure 17:
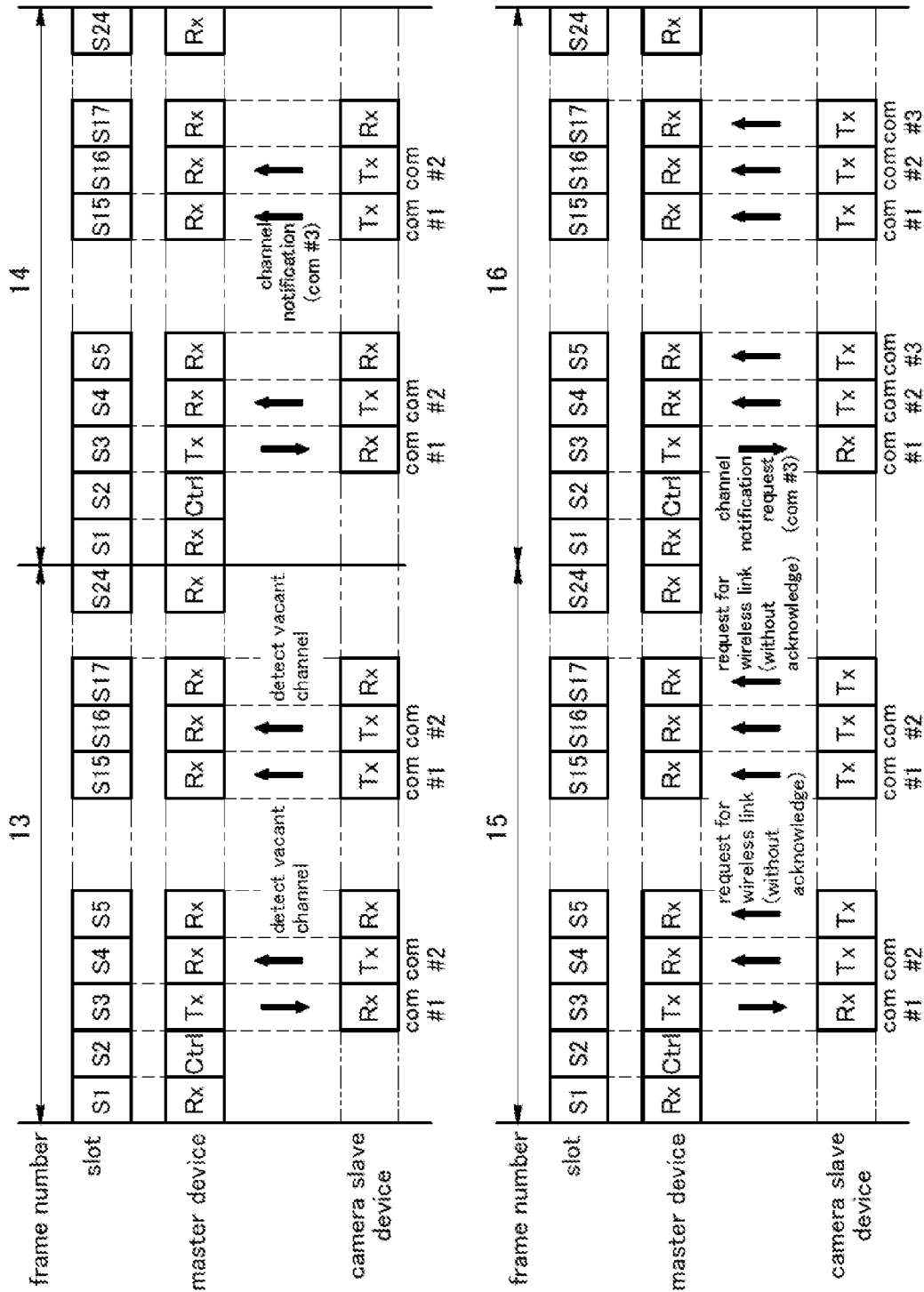
FIG. 17 is a diagram showing the functions of transmission and reception slots when activating a third communication channel of the camera slave device.

In step ST9, a third communication channel (communication channel #3: com #3) is activated. FIG. 17 is a diagram showing the functions of transmission and reception slots when activating the third communication channel of the camera slave device 3a. This corresponds to the operation in the lower part of interval 4 shown in FIG. 13. In frame 13 of FIG. 17, the camera slave device 3a looks for a vacant channel similarly as in the previous case. A vacant channel can be found by looking for slots (such as slots S5 and S17) following those that have been used (such as slots S4 and S16) in the illustrated embodiment.

In the example shown in FIG. 17, upon determining that slots S5 and S17 are vacant and available for use, the camera slave device 3a transmits to the master device 1 in frame 14 a channel notification signal containing information on the slots (S5 and S17) that are to be used for the third communication channel and the corresponding frequencies. As the two slots in the third communication channel are both configured for one-way communication, image data is transmitted from the camera slave device 3a to the master device 1 via these two slots S5 and S17. In this case also, as there is no data transmission in the opposite direction or from the master device 1 to the camera slave device 3a, the slot notation of the communication channel is 2:0.

In frame 15, request signals for the establishment of a wireless link are transmitted from the camera slave device 3a to the master device 1 via slots S5 and S17 that are detected to be vacant without requiring an acknowledgement.

Upon receiving request signals for the establishment of a wireless link via slots S5 and S17, the master device 1 transmits to the camera slave device 3a in frame 16 a channel notification response signal containing information on the slots (S5 and S17) that are to be used for the third communication channel and the corresponding frequencies via the first communication channel (slot S3) configured for two-way communication. The transmission of the channel notification signal (on the slots and frequencies of the third communication channel) from the camera slave device 3a via slot S15 and the request signal for the established of a wireless link via slots S4, S5, S16 and S17 is maintained. If any external interference is detected in the third communication channel, the process similar to that performed for the second communication channel is performed.

Thus, the communication via the third communication channel for transmitting image data from the slave device 3a to the master device 1 is enabled as a one-way communication via the two slots S5 and S17.

Figure 18:
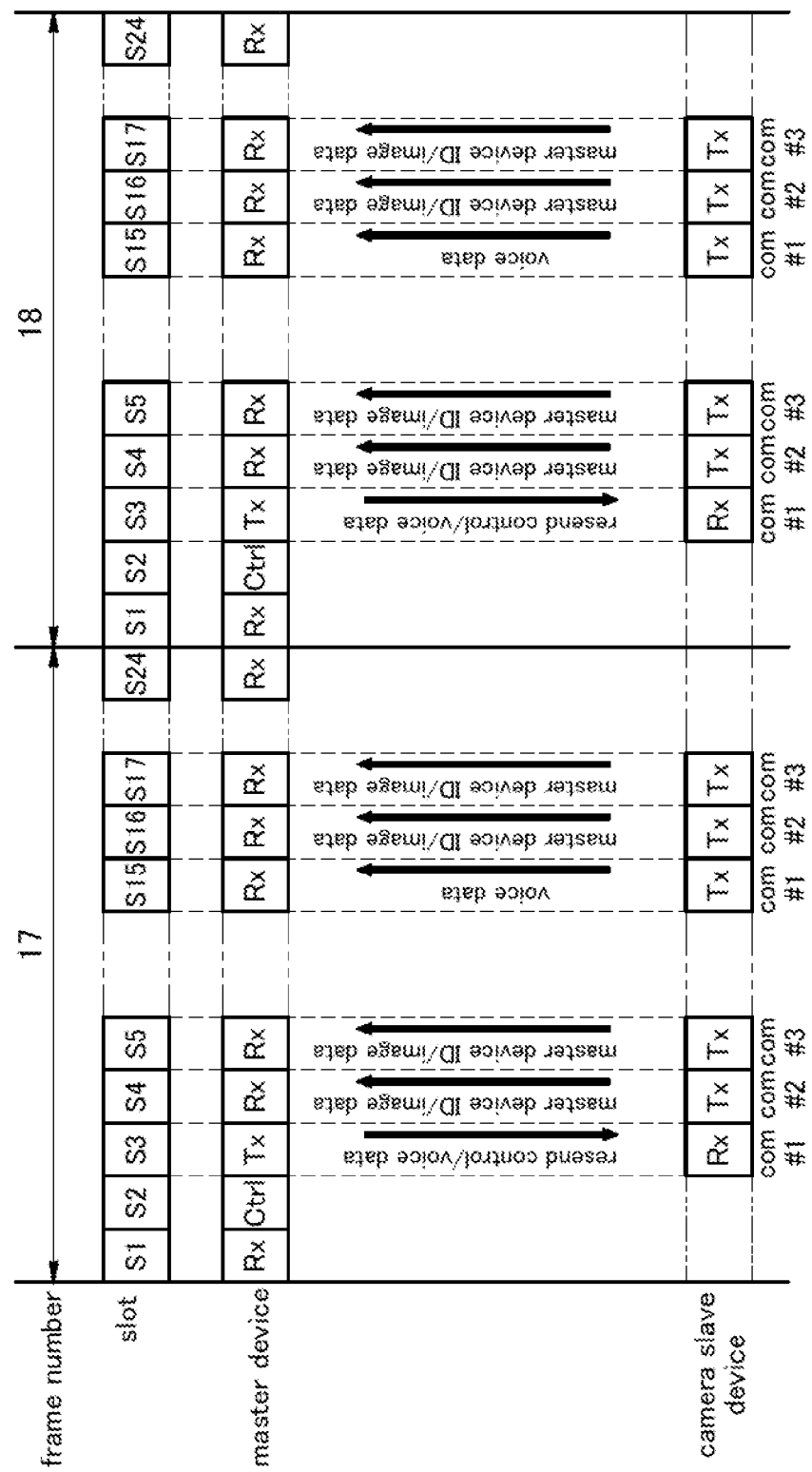
FIG. 18 is a diagram showing the functions of transmission and reception slots in a servicing phase at the time of activating the monitor of the camera slave device.

In step ST10, monitoring by the camera slave device 3a by means of voice and image data is performed. FIG. 18 is a diagram showing the functions of transmission and reception slots in a servicing phase at the time of activating the monitoring by the camera slave device 3a. This is performed in interval 5 of FIG. 13. In frame 17, transmission and reception of voice data and image data are performed by using six slots S3-S5 and S15-17.

More specifically, a resend control signal and a voice data signal are transmitted from the master device 1 to the camera slave device 3a via slot S3, and voice data is transmitted from the camera slave device 3a to the master device 1 via the corresponding slot S15. The camera slave device 3a transmits the master device ID (possibly along with other information) and the image data to the master device 1 via the paired slots S4 and S16, and likewise the master device ID and image data to the master device 1 via the other paired slots S5 and S17.

A similar process as that for frame 17 is performed for frame 18, and this is repeated in the following program flow.

To allow a two-way communication of the voice data between the master device 1 and the camera slave device 3a, one of the paired slots S3 and S15 is used for transmission from the master device 1, and the other slot is used for transmission from the camera slave device 3a. As the image data is transmitted from the camera slave device 3a to the master device 1 by one-way communication, to maximize the volume of data to be transmitted, and achieve a movie of high resolution and smooth movement, two pairs of slots S4 and S16, and S5 and S17 are used for image data transmission.

Suppose that the transmission from the camera slave device 3a to the master device 1 is an uplink transmission, and the transmission from the master device 1 to the camera slave device 3a is a downlink transmission. Then, of the six slots that have been activated, the voice data is transmitted and received via a slot for each of the uplink transmission and downlink transmission, and the image data is transmitted via the remaining four slots. Therefore, three communication channels are established for a single call such that 5:1 asymmetric data communication involving five uplink slots and one downlink slot may be achieved.

By thus carrying out the transmission of voice and image by using the 5:1 communication slot configuration that is activated as a result of a single call, the resend control signal for image transmission can be transmitted via the slot for voice data communication which requires comparatively small amount of data as compared to the image data. Therefore, the voice data and the resend control signal can be carried via a single channel so that when the channel is switched to a new one in case of a degradation of the wireless communication quality due to external wireless interferences, the number of channels that are involved in such a switching of channels can be minimized, and the communication quality can be improved. Because one of the slots that form a single channel for two-way voice data communication is used for transmitting a resend control signal, and no additional channel is required for the transmission of a resend control signal, the necessary number of channels for the wireless communication can be reduced, and some saving of resources can be achieved.

In step ST11, it is determined if the monitor operation by the camera slave device 3a may be terminated. If no termination operation is detected (pressing of an end button at the master device 1), steps ST10 and ST11 are repeated. Upon detection of a termination operation, steps ST12 to ST14 are executed. The first communication channel is terminated in step ST12, the second communication channel is terminated in step ST13, and the third communication channel is terminated in step ST14, before the program flow is concluded.

The mode of transmission and reception between the master device 1 and the monitor slave device 4 when the door phone slave device 2 is operated is described in the following.

Figure 19:
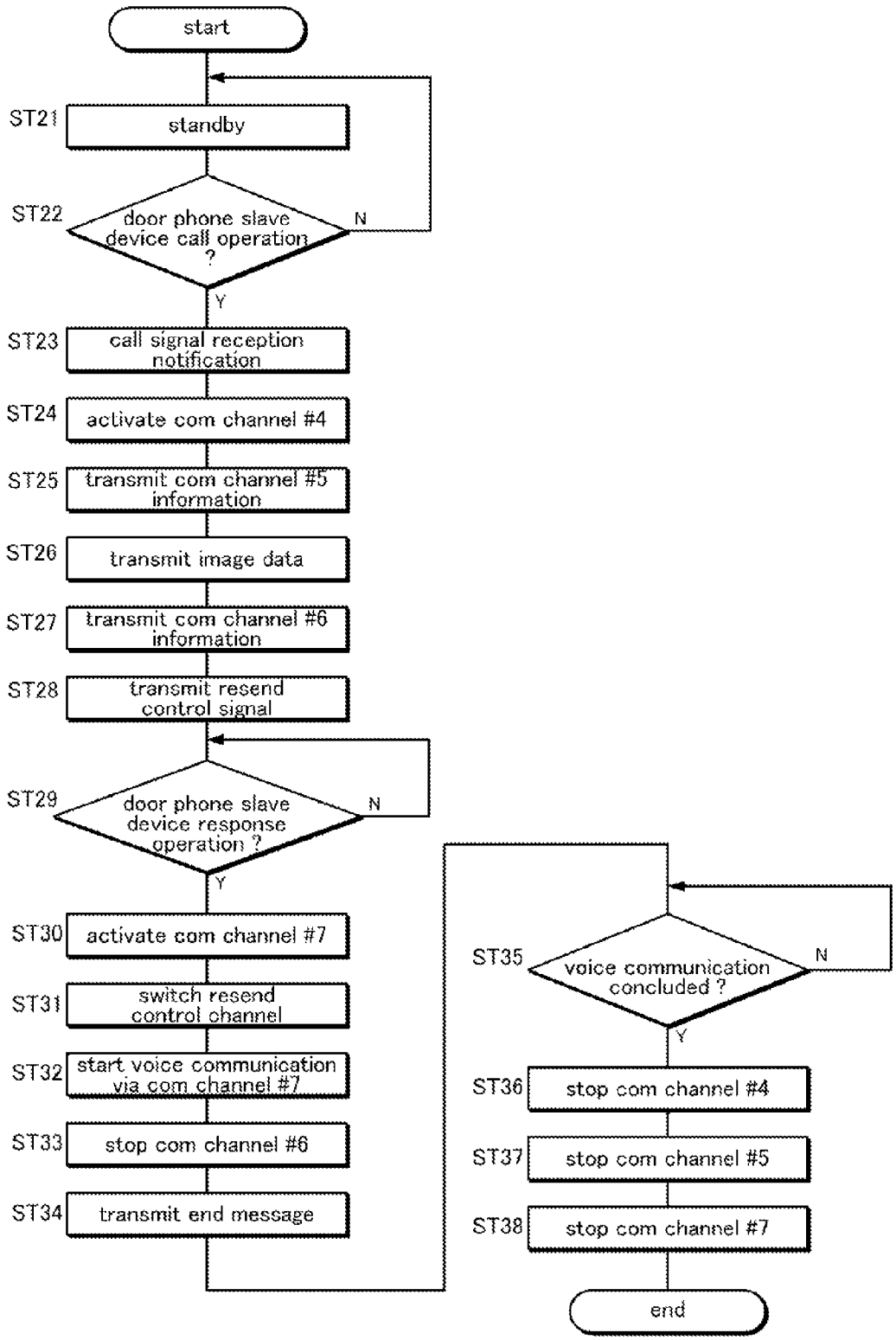
FIG. 19 is a flowchart showing the control process for the master device and a monitor slave device.
Figure 20:
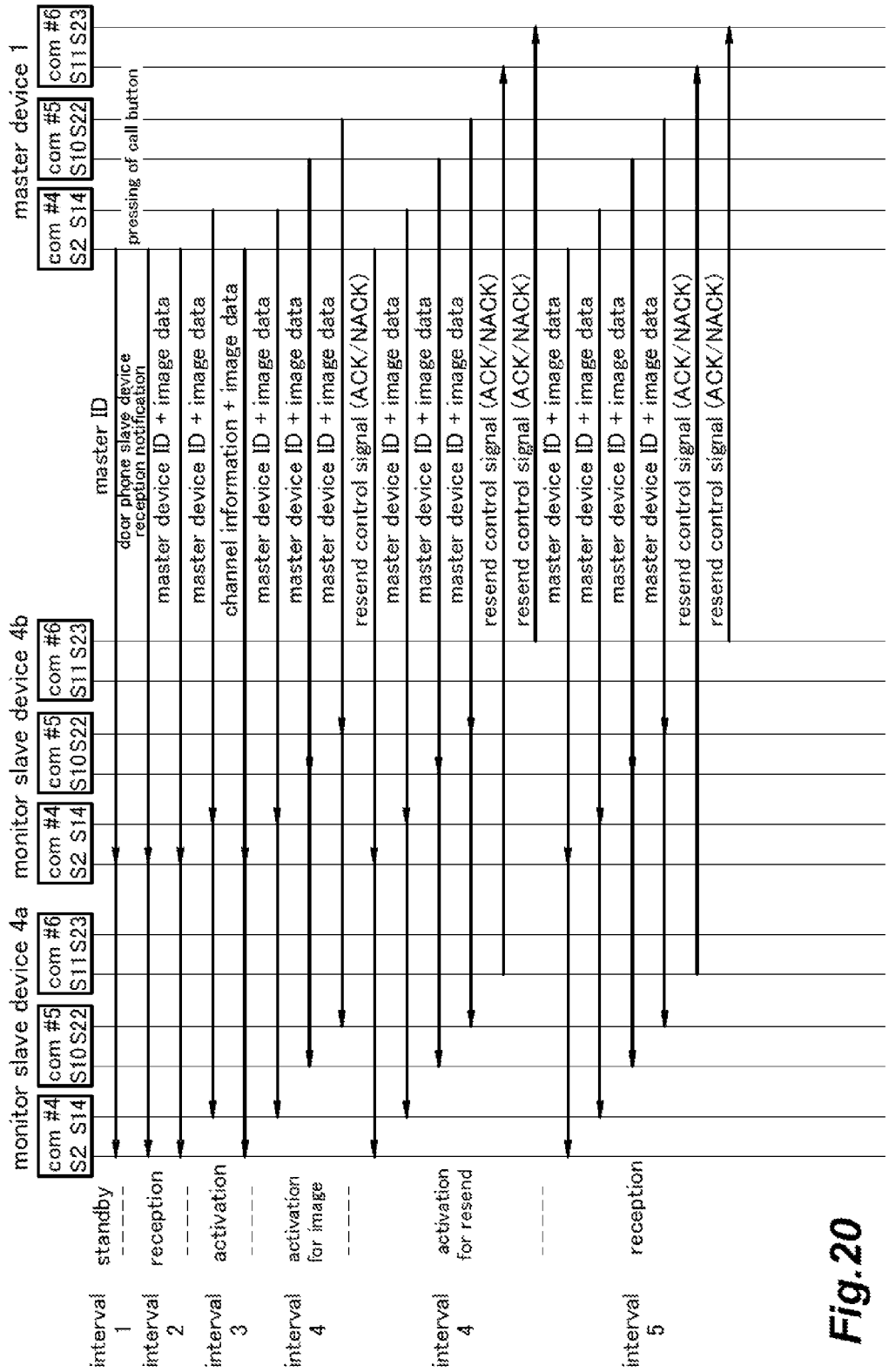
FIG. 20 is a sequence diagram for intervals 1 to 4 when a signal is received from a door phone slave device.

FIG. 19 is a flowchart showing the control process for the master device 1 and a monitor slave device 4, and FIG. 20 is a sequence diagram for the data transmission and reception between the master device 1 and the monitor slave devices 4 when a signal from a door phone slave device 2 is received. In FIG. 20, each phase of the control process that is carried out between one of the monitor slave devices 4 and the master device 1 is shown in a time series which progresses from top to bottom.

In step ST21 of FIG. 19, the master device 1 is in a standby condition awaiting a signal from a call button of the door phone slave device 2. In the following step ST22, the master device 1 determines if a call signal caused by pressing of the call button has been detected. If no call signal is detected in step ST22, steps ST21 and ST22 are repeated.

Figure 22:
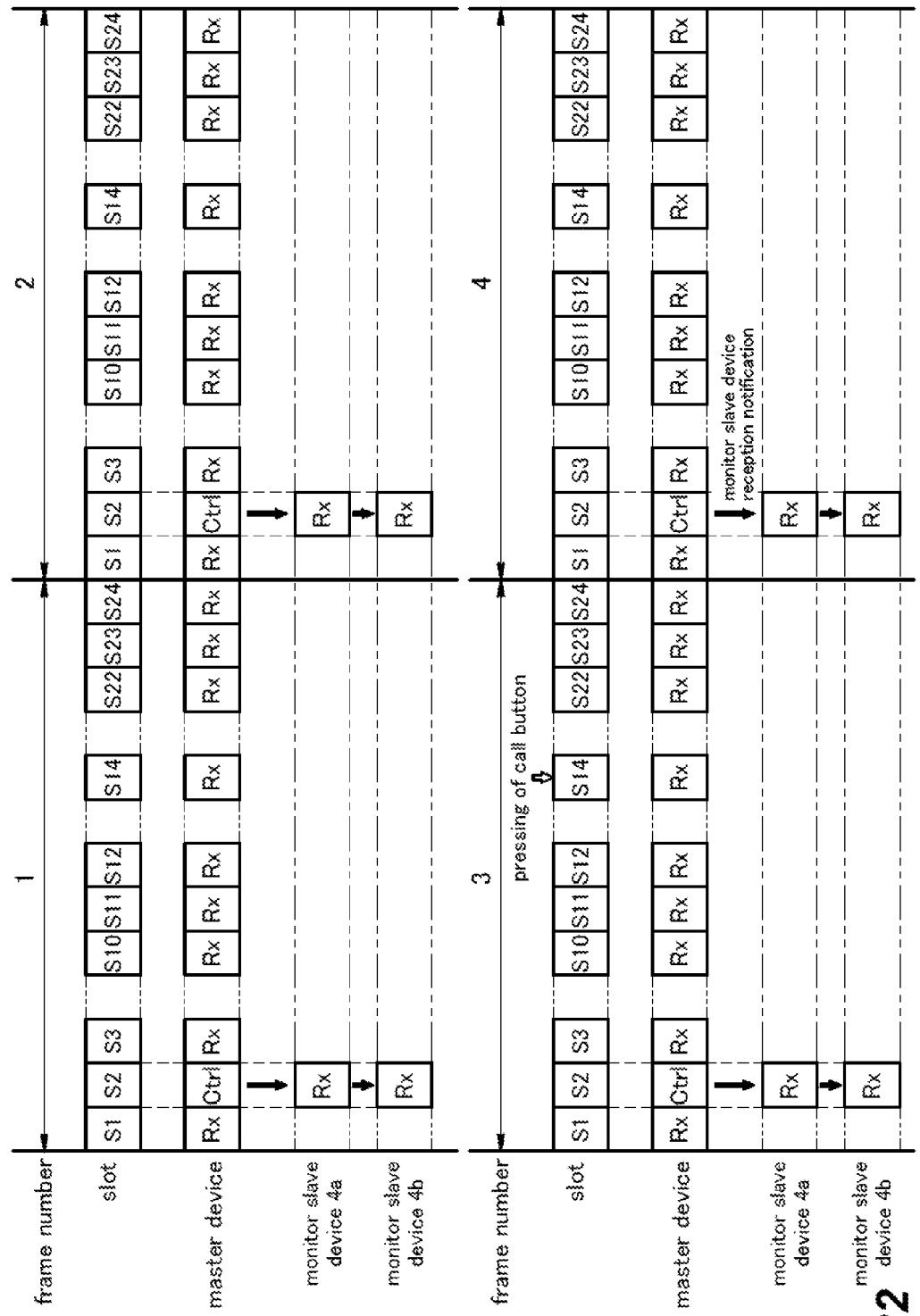
FIG. 22 is a diagram showing the functions of slots in an image phase when receiving a signal from the door phone slave device.

This condition corresponds to interval 1 in FIG. 20 and frames 1 and 2 in FIG. 22.

A fourth control channel (control channel #4: com #4) is used for transmitting a signal from the master device 1 to the monitor slave devices 4a and 4b as shown in interval 1 of FIG. 20 via slot S2 as shown in FIG. 22. The contents of the signal may include the master device ID and the slot number that is being used (and possibly other information). Each monitor device 4a, 4b receives the signal of the fourth control channel via the same slot S2. Similarly as above, in the standby condition, the master device 1 receives signals via the remaining 23 slots, excluding the slot S2 that is used for transmitting the control signal in the current frame, and awaits a request signal for the establishment of a wireless link from the camera slave devices 3 and the monitor slave devices 4 while monitoring the presence of an external interferences in each of the frequencies used for these slots.

If the call button of the door phone slave device 2 is pressed as shown in frame 3 of FIG. 22 while steps ST21 and ST22 are being executed, and a call signal is detected in step ST22, the program flow advances to step ST23. In step ST23, the fourth channel is used as was the case in interval 2 of FIG. 22, and a call signal reception notification signal from the door phone slave device 2 is transmitted from the master device 1 to each of the monitor slave devices 4a and 4b via slots S2 as shown in frame 4 of FIG. 22.

Figure 23:
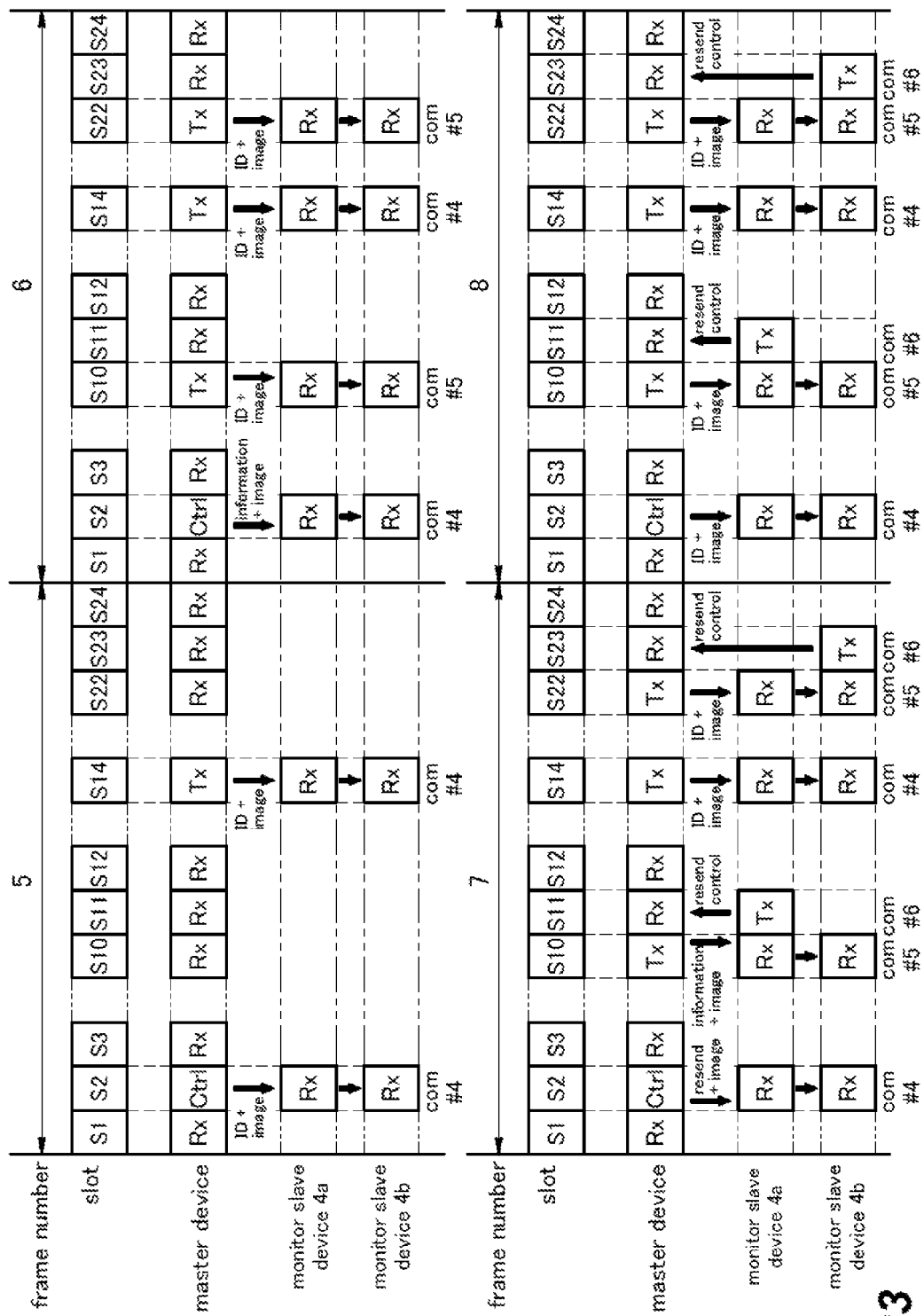
FIG. 23 is a diagram showing the functions of slots at the time of starting image transmission when receiving a signal from the door phone slave device.

In step ST24, the fourth control channel is activated as a communication channel, and by using a pair of slots consisting of slot S2 and slot S14 which is offset from slot S2 by 5 msec, as shown in frame 5 of FIG. 23, the master device 1 transmits a control signal containing the master device ID (and possibly other information) and image data in the information field thereof to each of the monitor slave devices 4a and 4b (interval 3).

In step ST25, by using the control field of the control channel formed by slot S2, a channel information notifying message for a fifth communication channel (communication channel #5: com #5) for image data transmission is transmitted (frame 6). In step ST26, as shown in frame 6 of FIG. 23, by using the information fields of the paired slots S10 and S22, the master device ID and image data are transmitted (interval 4). Thus, four slots S2, S10, S14 and S22 are used for transmitting image data.

Figure 21:
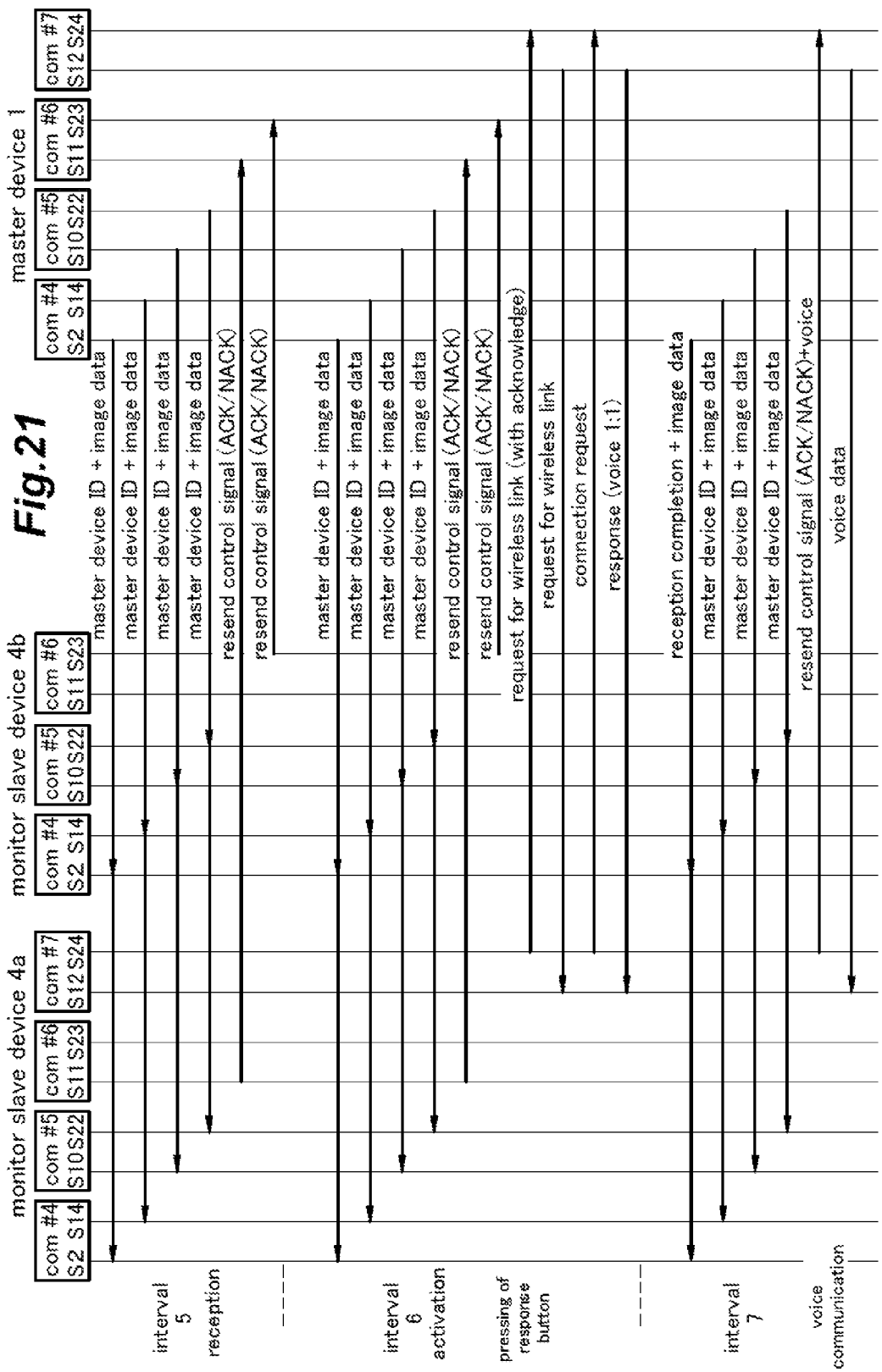
FIG. 21 is a sequence diagram for intervals 5 to 7 when a signal is received from the door phone slave device.

In step ST27, via slots S2, transmission of a channel information notifying message for a sixth communication channel (communication channel #6: com #6) for resend control is started by using the control field of the control channel (frame 7). In step ST28, as shown in frame 7 of FIG. 23, transmission of a resend control signal via the communication channel (communication channel #6: com #6) for one-way communication is started via slot S11 from the monitor slave device 4a and via slot S20 from the monitor slave device 4b (interval 5 in FIG. 21).

In step ST29, it is determined if a response button is pressed in either one of the monitor slave devices 4a and 4b. If a response button is not pressed in either monitor slave device, step ST29 is repeated, and frame 8 is maintained.

Figure 24:
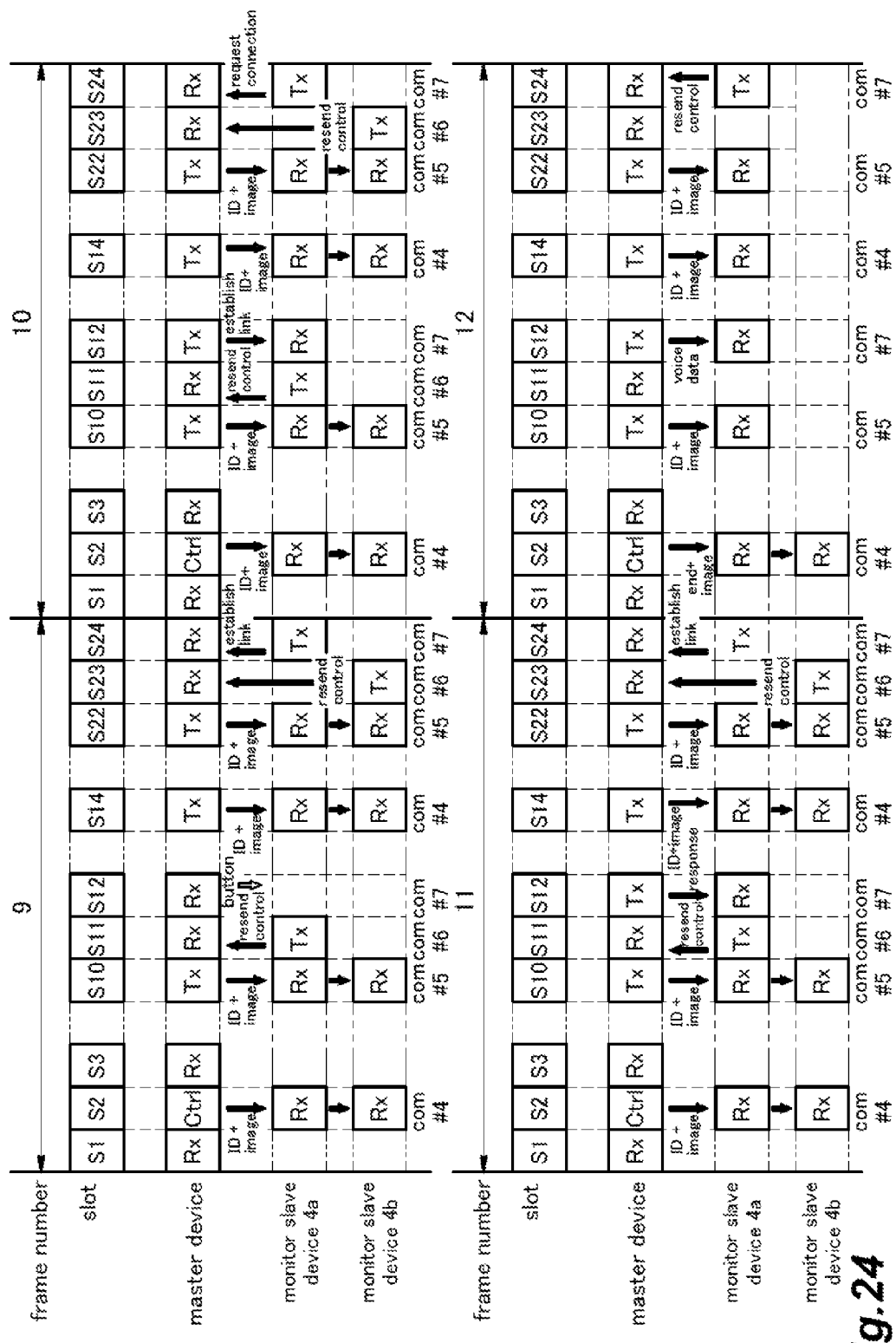
FIG. 24 is a diagram showing the functions of slots at the time of voice communication when receiving a signal from the door phone slave device.

In step ST29, if it is determined that the response button is pressed in either one of the monitor slave devices 4a and 4b, the program flow advances to step ST30 where a seventh communication channel (communication channel #7: com #7) is activated by using slots S12 and S24 as shown in frame 9 of FIG. 24 (interval 6). By using slot S24, a request signal for the establishment of a wireless link is transmitted from the monitor slave device 4a to the master device 1 requiring an acknowledgement.

As shown in frame 10, once having acknowledged the establishment of a wireless link, the master device 1 transmits an acknowledge signal for the establishment of a wireless link by using slot S12. In response to this, the monitor slave device 4a transmits a connection request signal by using slots S24. As shown in frame 11, in response to the connection request signal, the master device 1 transmits a response signal via a 1:1 communication channel using slot S12 (interval 6).

In step ST31, the communication channel that has been used for resend control signals is changed from the sixth communication channel to the seventh communication channel. In step ST32, as shown in frame 12, voice data is transmitted from the master device 1 via slot S12, and signals containing both resend control signals and voice data are transmitted from the monitor slave device 4a via slot S24 (interval 7). The transmission of voice data is started via the seventh communication channel in this manner.

In step ST33, as shown in frame 12, the sixth communication channel is deactivated. In step ST34, by using the control field of the control channel of the seventh communication channel, transmission of a reception completion notification message from the door phone slave device 2 is started. Then, as shown in frame 12, by using the fourth control channel, the master device 1 transmits a reception completion signal and image data via slot S2 and the master device ID and the image data via slot S14. At the same time, by using the fifth communication channel, the master ID and image data are transmitted via both slots S10 and S22. By using the seventh communication channel, the master device 1 transmits voice data via slot S12, and the monitor slave device 4a transmits voice data via slot S24 (interval 7).

In step ST35, it is determined if the voice communication has ended. If the voice communication is still in progress, step ST35 is repeated in frame 12. Once the voice communication has ended, the program advances to step ST36 where the transmission via slots S2 and S14 using the fourth communication channel as a control channel is ended owing to the termination of the voice communication. The transmission via slots S10 and S22 of the fifth communication channel is then ended in a similar fashion in step ST37, and the transmission via slots S12 and S24 of the seventh communication channel is ended in a similar fashion, before concluding the program flow.

Figure 25:
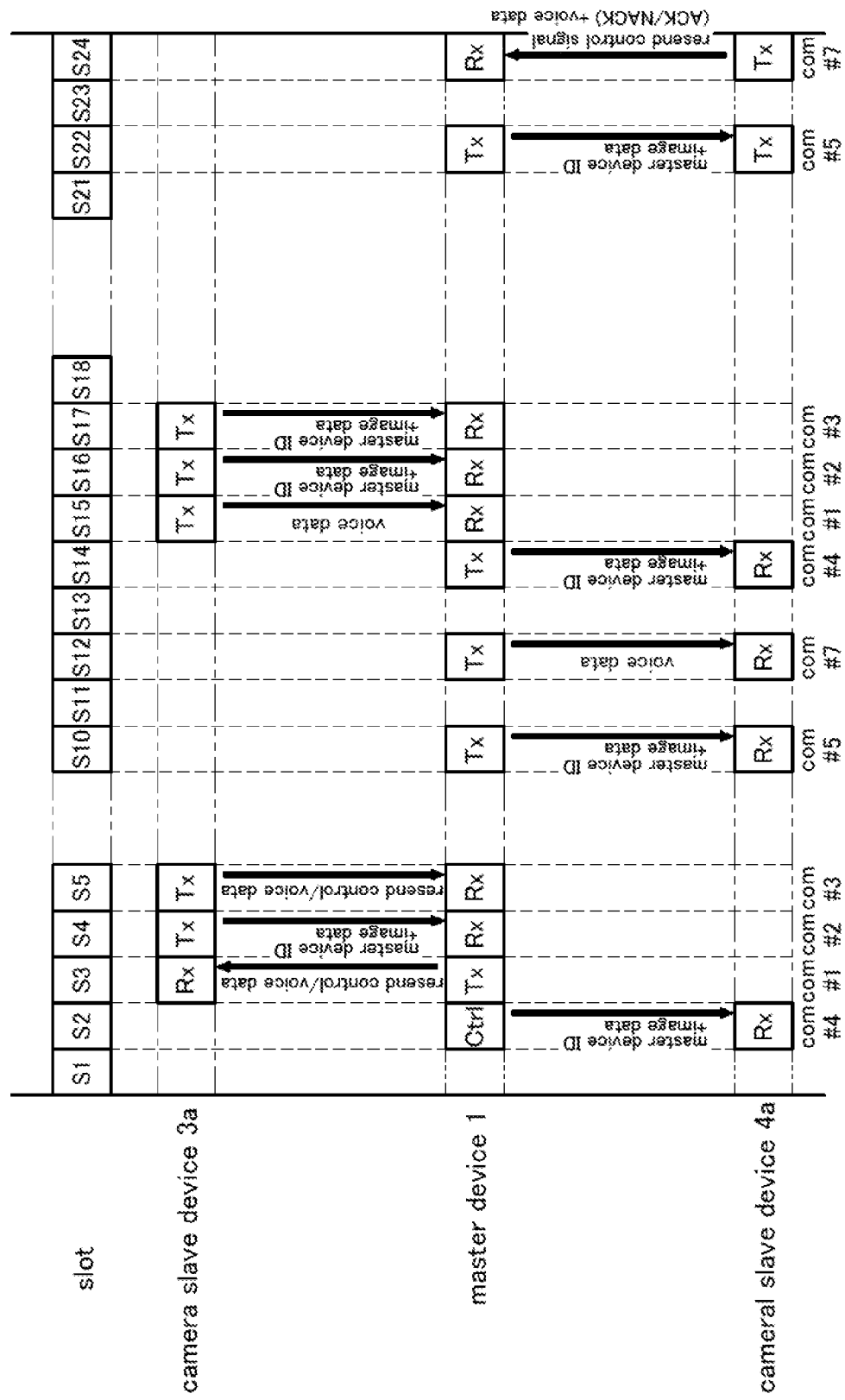
FIG. 25 is a diagram showing the functions of slots when communication between the camera slave device and the monitor slave device is in progress.

FIG. 25 is a diagram showing the functions of slots when communication between the camera slave device 3a and the monitor slave device 4a is in progress. The relationship between the master device 1 and the camera slave device 3a is the same as that in frame 18 of FIG. 18. As for the relationship between the master device 1 and the monitor slave device 4, similarly as in FIG. 24, the master device 1 transmits the master device ID and the image data via slot S2 of the fourth communication channel, the master device ID and the image data via slot S10 of the fifth communication channel, the voice data via slot S12 of the seventh communication channel, the master device ID and the image data via slot S14 which is paired by slot S2, and the master device ID and the image data via slot S22 which is paired by slot S19. The monitor slave device 4 transmits resend control signals and the voice data to the master device 1 via slot S24 which is paired by slot S12. The communication between the camera slave device 3 and the monitor slave device 4 is performed in this manner.

Figure 26:
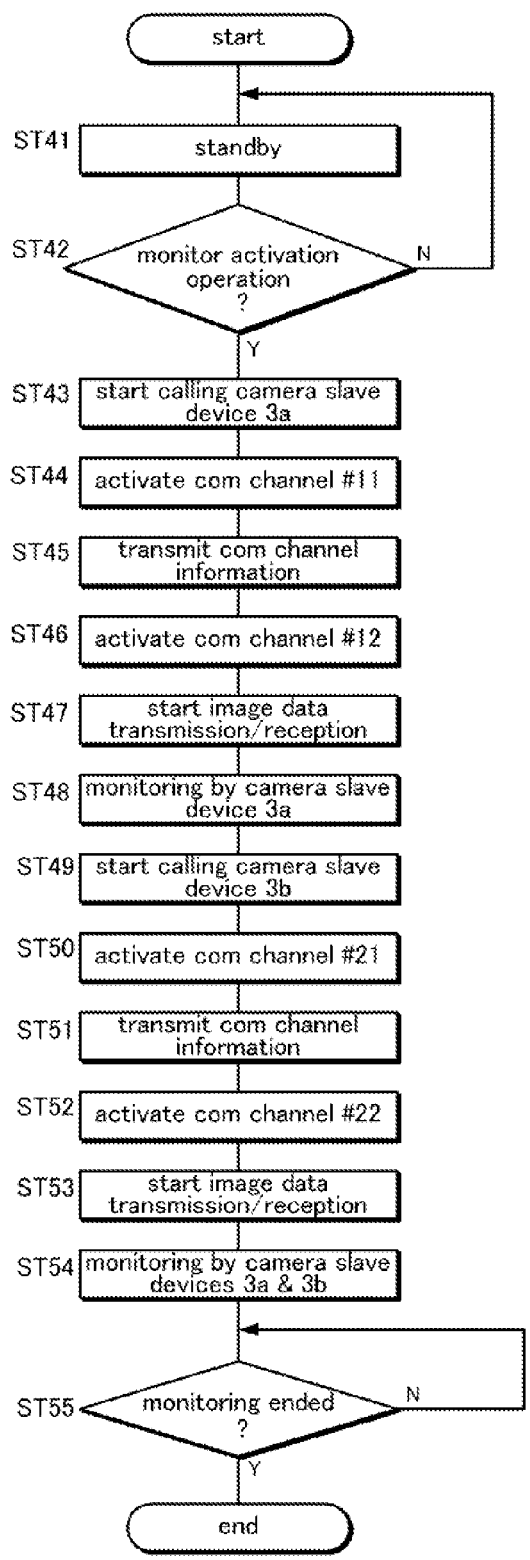
FIG. 26 is a flowchart showing the control process for the camera slave devices at the time of simultaneous activation.
Figure 27:
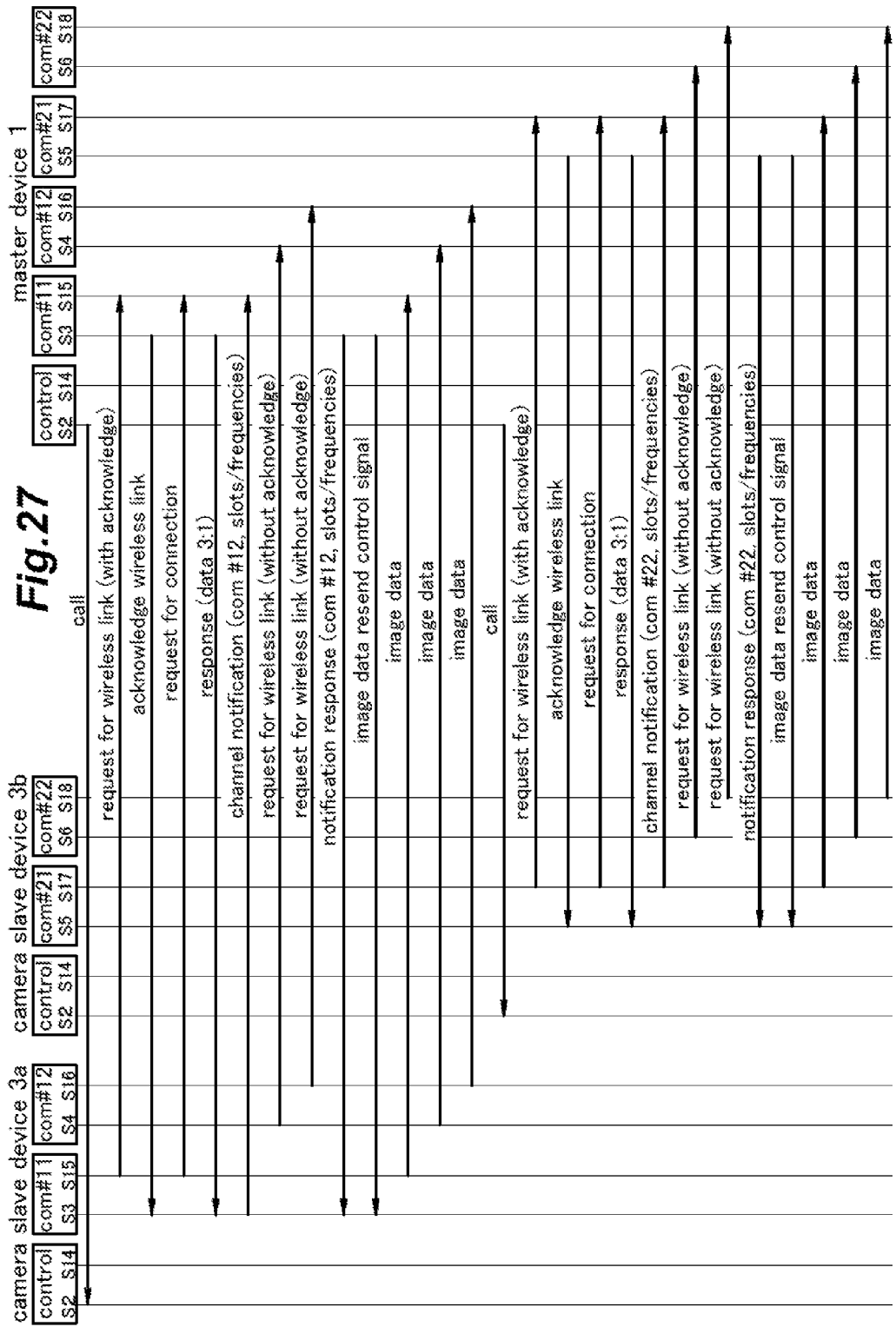
FIG. 27 is a sequence diagram of the camera slave devices at the time of simultaneous activation.

FIG. 26 is a flowchart showing the control process for the camera slave devices 3a and 4a at the time of simultaneous activation. FIG. 27 is a sequence diagram of the camera slave devices corresponding to the program flow shown in FIG. 26. In FIG. 26, each phase of the control process that is carried out between the camera slave devices 3a and 3b, and the master device 1 is shown in a time series which progresses from top to bottom.

Figure 28:
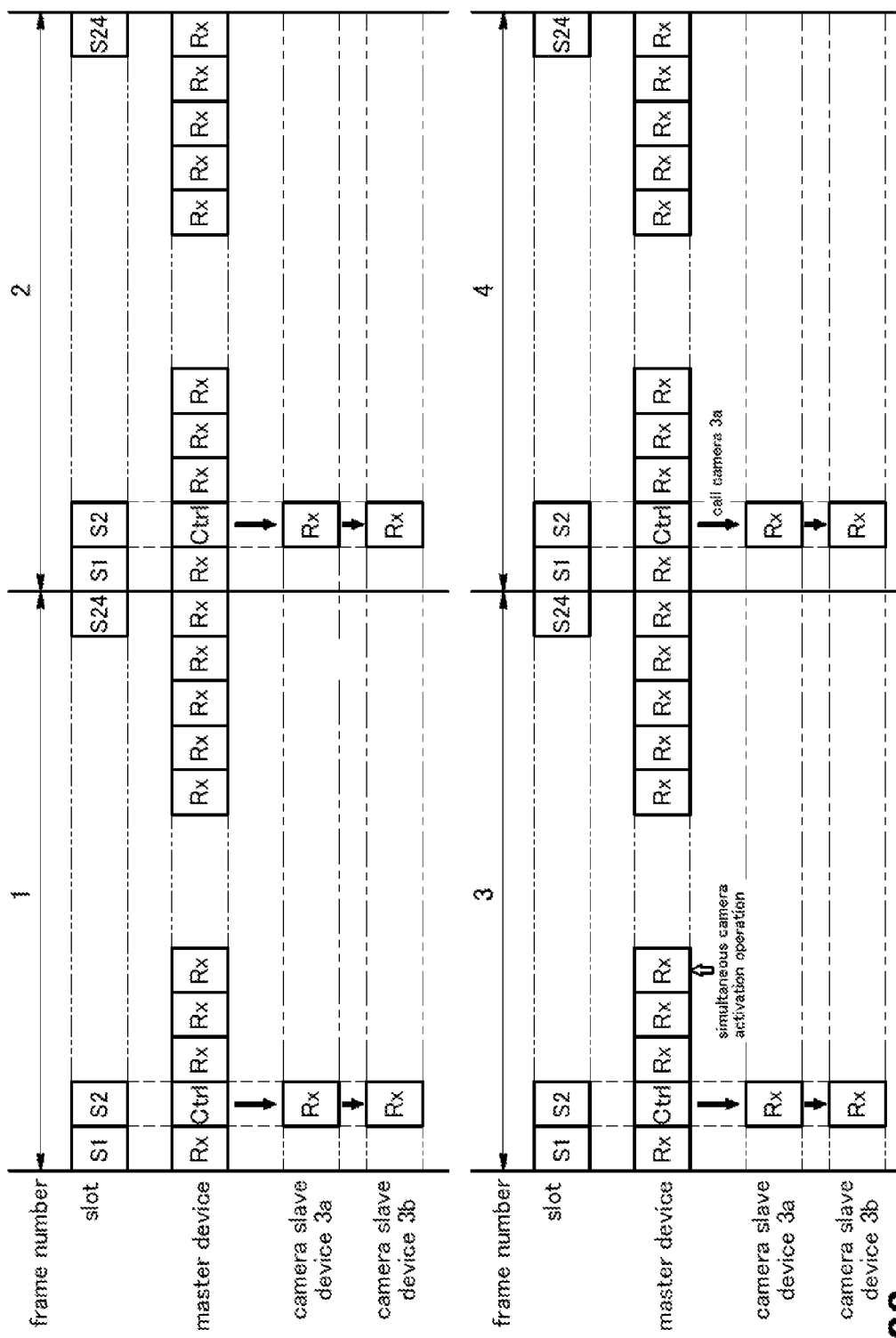
FIG. 28 is a diagram showing the functions of slots in a calling phase of one of the camera slave devices at the time of simultaneous activation.

Steps ST41 to ST43 in FIG. 26 correspond to steps ST1 to ST3 in FIG. 12. FIG. 28 is similar to FIG. 14, but two camera slave devices 3a and 3b are involved instead of one. The camera slave devices 3a and 3b are in standby condition in frames 1 and 2 of FIG. 28, and are simultaneously activated in frame 3.

In step ST43, by using slot S2 as shown in frame 4 of FIG. 28, the master device 1 transmits a control channel signal including a camera slave device call signal to the camera slave device 3a, and the call signal is received by the camera slave device 3a. See the call process for the camera slave device 3a shown in FIG. 27.

In step ST44, an eleventh communication channel (communication channel #11: com #11) is activated. As shown in frame 5 of FIG. 29, the camera slave device 3a looks for a vacant channel. When the eleventh communication channel is found to be vacant, for instance, as shown in frame 6 of FIG. 29, the camera slave device 3a transmits a request signal for establishing a wireless link to the master device 1 via slot S18 without requiring an acknowledgement.

Figure 29:
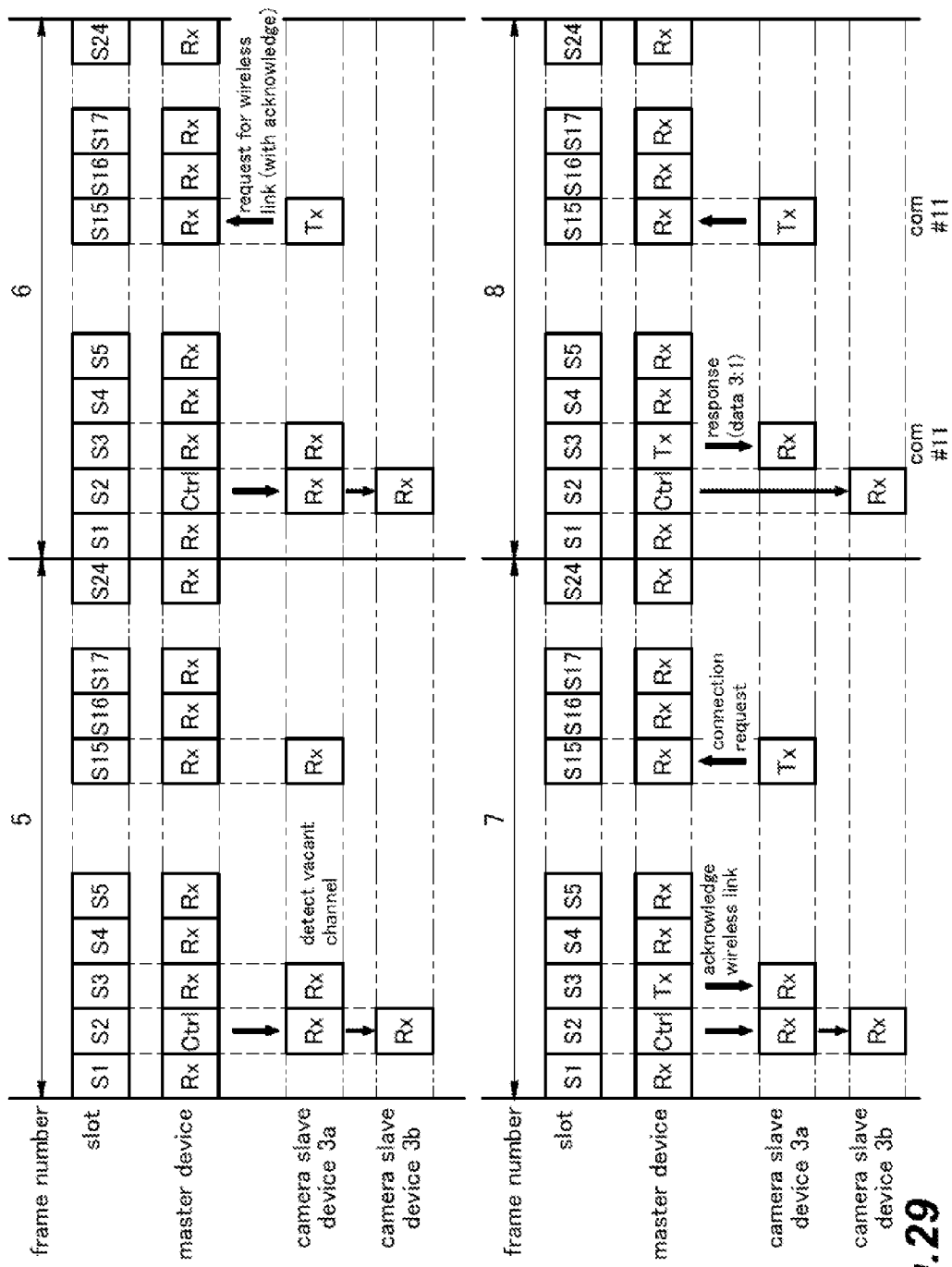
FIG. 29 is a diagram showing the functions of slots in a communication channel establishing phase of one of the camera slave devices at the time of simultaneous activation.

As shown in frame 7 of FIG. 29, the master device 1 transmits to the camera slave device 3a an acknowledge signal for the establishment of a wireless link in response to the channel notification response via slot S3 corresponding to slot S15. In response, the camera slave device 3a transmits a connection request signal to the master device 1 via slot S15.

In step ST45, as shown in frame 8 of FIG. 29, the master device 1 transmits to the camera slave device 3a a response signal indicating a 3:1 slot configuration via slot S3 of the eleventh communication channel. The camera slave device 3a then transmits signal to the master device 1 via slot S15 which is paired by slot S3. As a result, the eleventh communication channel is used for bi-directional communication such that the uplink from the camera slave device 3a to the master device 1 consists of image data, and the downlink from the master device 1 to the camera slave device 3a consists of a resend control signal. The transmission of signals to the camera slave device 3a via slot S2 of the control channel is terminated.

Figure 30:
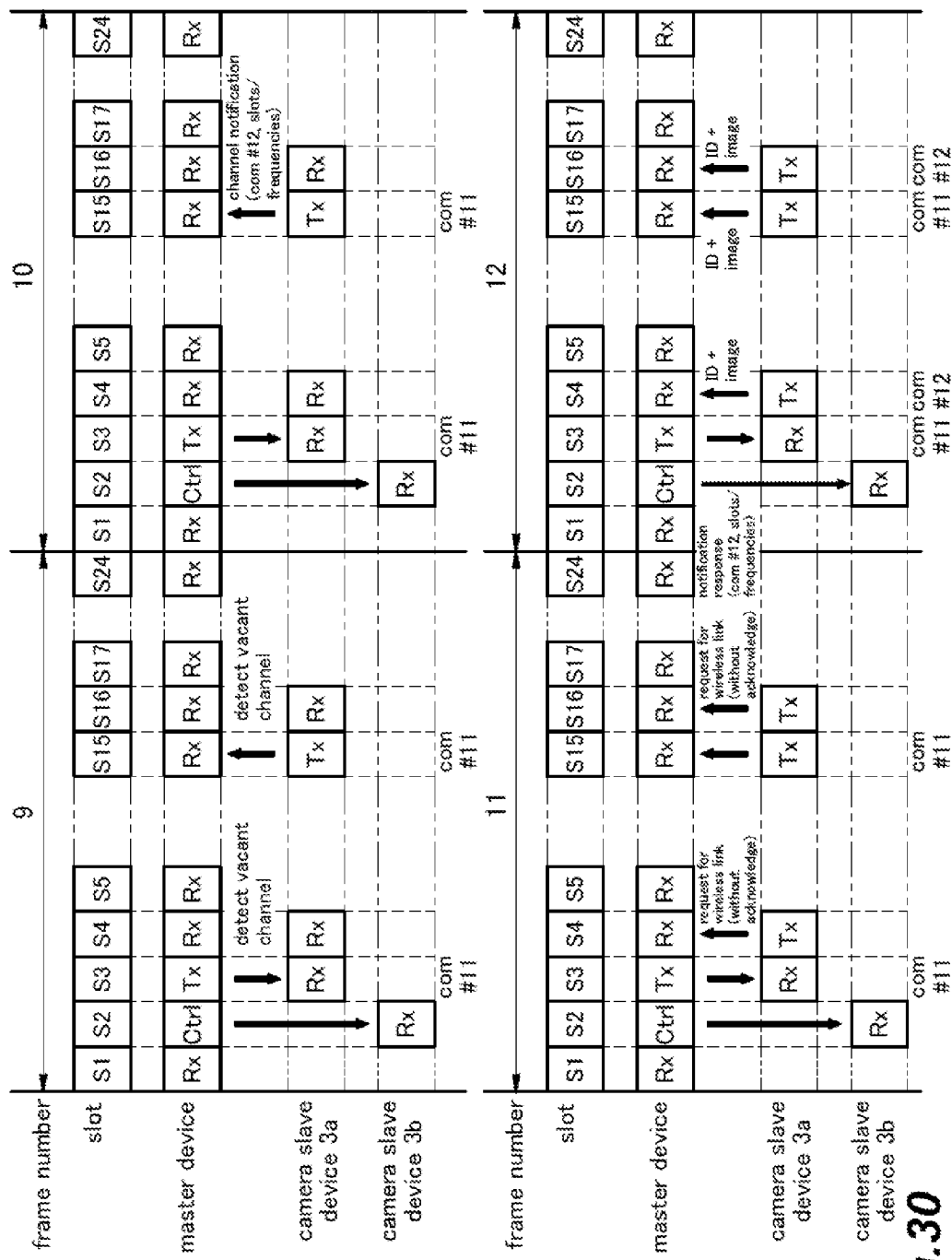
FIG. 30 is a diagram showing the functions of slots in a communication channel starting phase of one of the camera slave devices at the time of simultaneous activation.

As shown in frame 9 of FIG. 30, in step ST46, a twelfth communication channel (communication channel #12: com #12) is activated. First of all, the camera slave device 3a selects the slots and frequencies for the twelfth communication channel, and looks for a vacant channel. As shown in frame 9 of FIG. 30, when the camera slave device 3a has selected slot S4 and slot S16 for the twelfth communication channel, for instance, the availability of slot S4 and slot S16 is determined. If it is determined that the twelfth communication channel is vacant, and available for use, as shown in frame 10 of FIG. 30, the camera slave device 3a transmits information on the slots (S4 and S16) and the corresponding frequencies that are to be used for the twelfth communication channel, via slot S15.

As shown in frame 11 of FIG. 30, via slots S4 and S16 of the twelfth communication channel, the camera slave device 3a transmits a request signal for the establishment of a wireless link without requiring an acknowledgement.

In step ST47, transmission and reception of image data between the camera slave device 3a and the master device 1 are started. As shown in frame 12, the camera device 3a transmits the master device ID and the image data by using the two channels S4 and S16 of the twelfth communication channel. In this manner, the camera slave device 3a transmits image data to the master device 1 as a uni-directional (one-way) communication by using the two slots S4 and S16.

Figure 31:
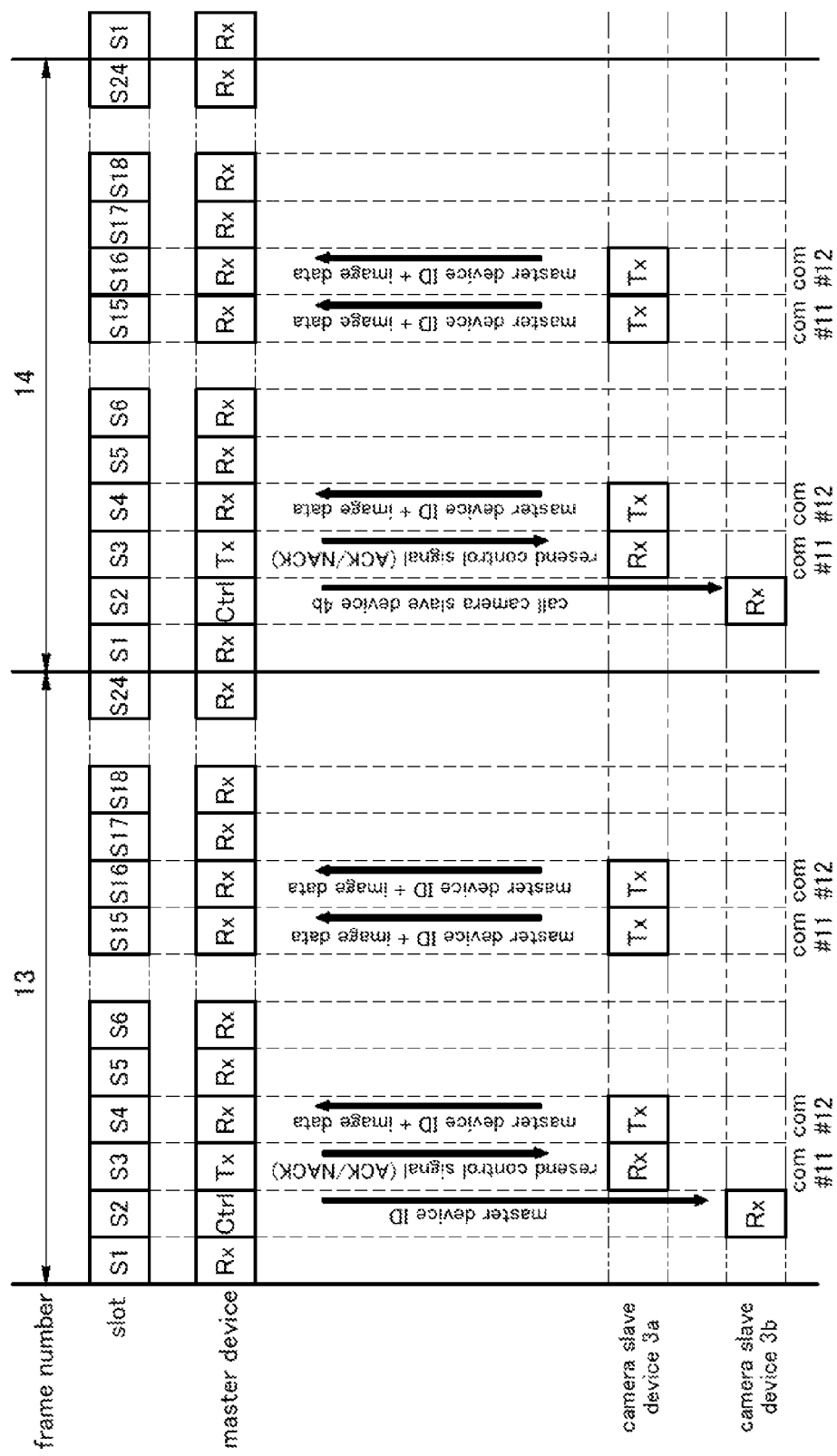
FIG. 31 is a diagram showing the functions of slots in a calling phase of the other camera slave device at the time of simultaneous activation.

In step ST48, the monitoring by the camera slave device 3a is performed in frame 13 of FIG. 31. The resend control signal using slot S3 of the eleventh communication channel is used for the purpose of synchronization. As a result, transmission of a response signal is executed in a 3:1 slot configuration such that three slots are used for the image data and one slot is used for the control signal, of the four slots of the eleventh and twelfth communication channels.

In step ST49, in order to activate the two camera slave devices 3a and 3b, calling of the second camera slave device 3b is started. As shown in frame 14 of FIG. 31, a call signal for the second camera slave device 3b is transmitted to the second camera slave device 3b via slot S2, and this call signal is received by the second camera slave device 3b (a call for the second camera slave device 3b as shown in FIG. 27).

Figure 32:
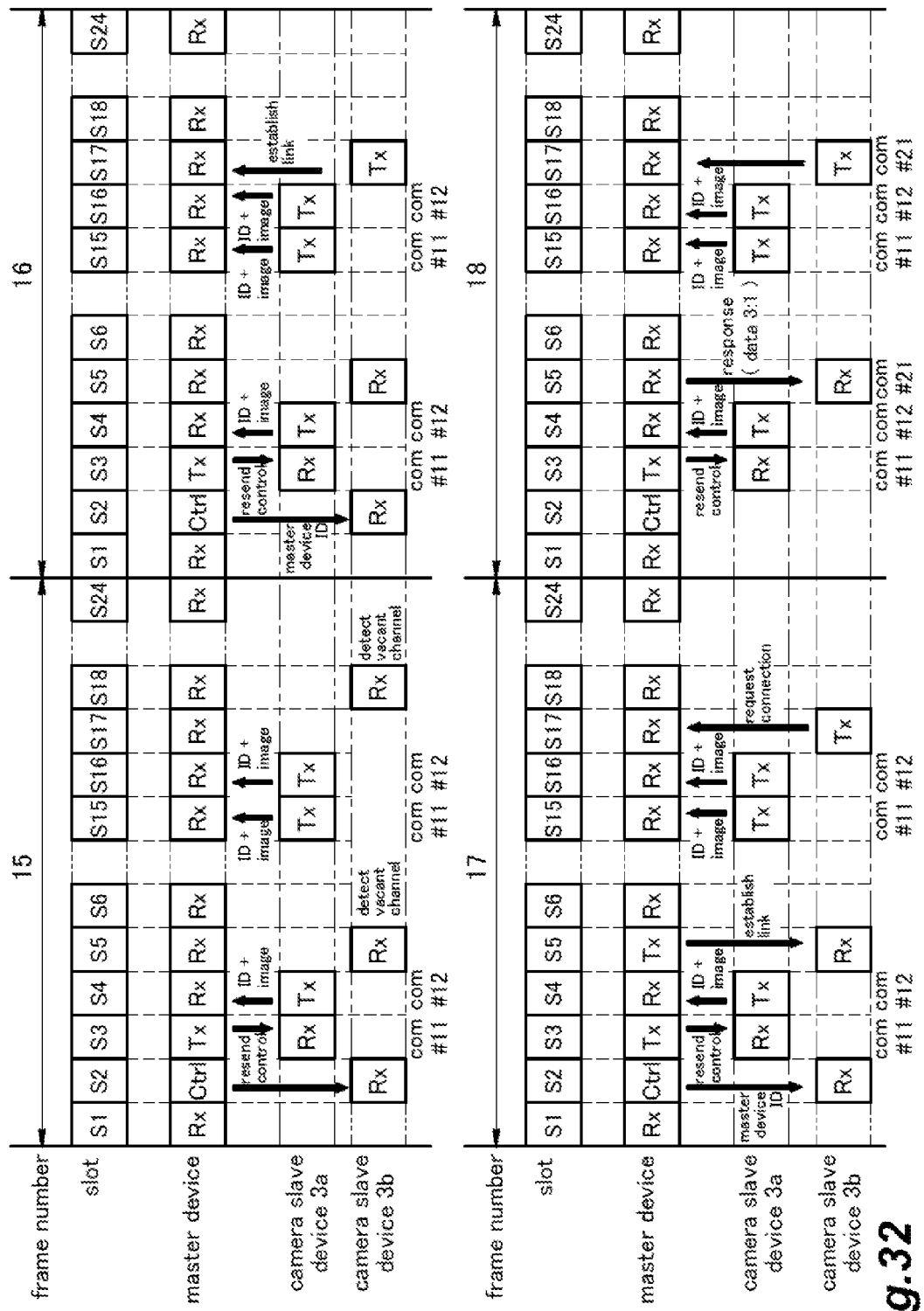
FIG. 32 is a diagram showing the functions of slots in a communication channel establishing phase of the other camera slave device at the time of simultaneous activation.

In step ST50, as shown in frame 15 of FIG. 32, the camera slave device 3b looks for a vacant channel. When a vacant channel consisting of slots S5 and S17 that are paired is detected, the camera slave device 3b transmits a request signal for establishing a wireless link to the master device 1 via slot S17 (in frame 16) requiring an acknowledgement.

As shown in frame 17 of FIG. 32, the master device 1 transmits an establishment acknowledge signal serving as a channel notification response to the camera slave device 3b. Once the establishment of a wireless link is acknowledged, the camera slave device 3b transmits a connection request signal to the master device 1 via slot S17. In response, as shown in frame 18 of FIG. 32, the master device 1 transmits a response signal to the camera slave device 3b via slot S5, indicating that the number of slots to be used for data is three and the number of slots for control signals is one, similarly as in the aforementioned case. In this case also, the uplink from the camera slave device 3b to the master device 1 consists of image data, and the downlink from the master device 1 to the camera slave device 3b consists of resend control signals.

Figure 33:
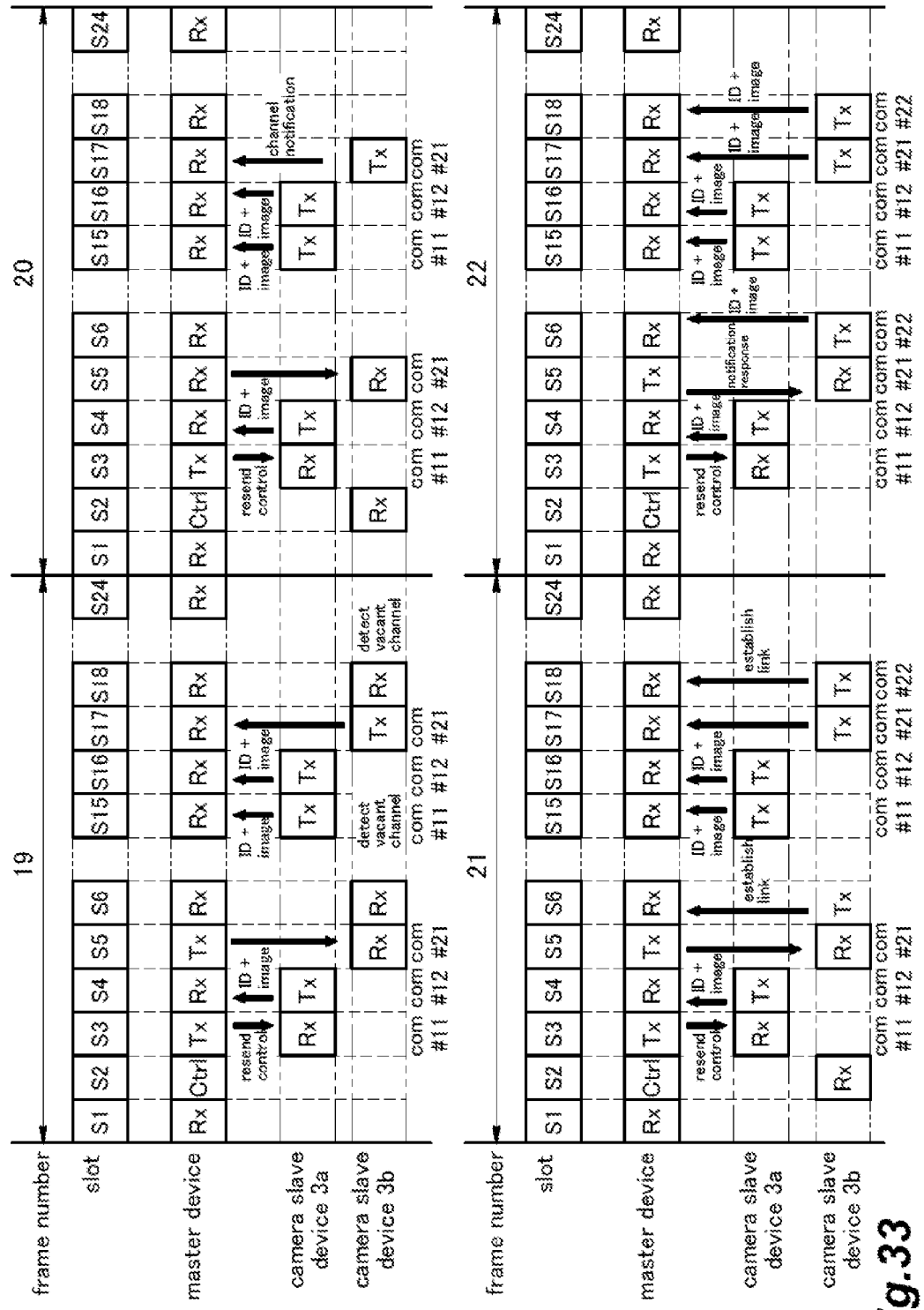
FIG. 33 is a diagram showing the functions of slots in a communication channel starting phase of the other camera slave device at the time of simultaneous activation.

Then, as shown in frame 19 of FIG. 33, in step ST52, a twenty second communication channel (communication channel #22: com #22) is activated. First of all, the slots and frequencies that are to be used for the twenty second communication channel are selected, and it is determined if this communication channel is vacant. As shown in frame 19 of FIG. 33, when the camera slave device 3b has selected slots S6 and S18 for the twenty second communication channel, for instance, it is determined if these slots S6 and S18 are available for use. When the twenty second communication channel is determined to be vacant, as shown in frame 20 of FIG. 33, the camera slave device 3b transmits information on the slots S6 and S18 and the corresponding frequencies that are to be used for the twenty second communication channel to the master device 1 via slot S17.

As shown in frame 21 of FIG. 33, by using the slots S6 and S18 for the twenty second communication channel, the camera slave device 3b transmits a request signal for establishing a wireless link without requiring acknowledgement.

In step ST53, image data is transmitted from the camera slave device 3b to the master device 1. As shown in frame 22, the master device ID and the image data are transmitted from the camera slave device 3b to the master device 1 via both slots S6 and S18 of the twenty second communication channel. In this manner, the camera slave device 3b transmits image data to the master device 1 as a uni-directional (one-way) communication by using the two slots S6 and S18.

In step ST54, the simultaneous monitoring by the camera slave devices 3a and 3b is performed as shown in the lower part of the sequence diagram of FIG. 27. The resend control signal using slot S5 of the twenty first communication channel is used for the purpose of synchronization. As a result, in the case of the second camera slave device 3b also, transmission of response signal is executed in a 3:1 slot configuration such that three slots are used for the image data and one slot is used for the control signal, of the four slots of the twenty first and twenty second communication channels.

In step ST55, it is determined if the monitoring by the camera slave devices 3a and 3b is to be ended. In absence of an end signal, steps ST54 and ST55 are repeated. Upon receipt of an end signal, the program flow is concluded, and a standby condition is put in place.

The simultaneous monitoring by the two camera slave devices 3a and 3b can be achieved in this manner. When a simultaneous monitoring by a plurality of camera slave devices is being performed, the transmission and reception of voice data may be avoided because the sounds from a plurality of locations may be produced from the master device 1 (or a monitor slave device 4) as a mixture, and it could be confusing.

Although the present invention has been described in terms of a preferred embodiment thereof, it is obvious to a person skilled in the art that various alterations and modifications are possible without departing from the scope of the present invention which is set forth in the appended claims. For instance, four slots were used in the foregoing embodiment for the transmission of image data, but less or more slots may also be used depending on the volume of data that is to be transmitted. Some of the components that are used in the foregoing embodiment may not be necessarily indispensable for the working of the present invention, but may be omitted and replaced with others without departing from the spirit of the present invention.

According to the wireless communication method of the present invention, by using channels each consisting of a pair of slots, uni-directional and bi-directional communications are performed in a suitable manner so that a maximum amount of data can be transmitted with a minimum number of channels.

The contents of the original Japanese patent application on which the Paris Convention priority claim is made for the present application as well as the contents of the prior art references mentioned in this application are incorporated in this application by reference.

The invention claimed is:

1. A wireless communication method for performing a wireless communication between a master device and a slave device via a wireless link based on a time division method using a plurality of channels defined for each time frame, each channel being formed by a pair of time slots defined along a time axis and spaced from each other by a prescribed time period, comprising:
   a bi-directional communication where data is transmitted from the master device to the slave device by using one of the slots of a selected one of the channels, and from the slave device to the master device by using the other slot of the selected channel; and
   a uni-directional communication where data is transmitted from one of the master device and the slave device to the other by using the slots of remaining channels;
   one of the slots of the selected channel being used for transmitting a resend control signal for the data transmitted in the uni-directional communication,
   wherein the master device is configured to execute a service notification phase when a time division wireless link is established between the master device and the slave device, the service notification phase including the step of notifying service contents to the slave device by using a first communication channel selected from the channels in the bi-directional communication to communicate that voice data is to be transmitted in a 1:1 communication and image data is to be transmitted in a N:0 communication, N being an integer equal to or greater than 2.

2. The wireless communication method according to claim 1, wherein image data is transmitted by the uni-directional communication using the remaining channels.

3. The wireless communication method according to claim 1, wherein voice data is transmitted in the bi-directional communication such that one of the slots of the selected channel is used for transmitting a voice signal and the other slot is used for transmitting both a voice signal and a resend control signal for controlling a resending of image data.

4. The wireless communication method according to claim 1, wherein upon being notified of the N:0 communication for image data, the slave device performs a uni-directional communication to the master device by using N channels excluding the selected channel.

5. The wireless communication method according to claim 1, wherein the slave device comprises at least one of a camera slave device and a monitor slave device.

6. The wireless communication method according to claim 1, wherein the wireless communication is performed between a master device and a plurality of slave devices.

7. A wireless communication system for performing a wireless communication between a master device and a slave device via a wireless link based on a time division method using a plurality of channels defined for each time frame, each channel being formed by a pair of time slots defined along a time axis and spaced from each other by a prescribed time period, comprising:
   a master device including a wireless unit for performing a wireless communication; and
   a slave device including a wireless unit for performing a wireless communication;
   the master device and the slave device being configured to perform:
      a bi-directional communication where data is transmitted from the master device to the slave device using one of the slots of a selected one of the channels, and from the slave device to the master device using the other slot of the selected channel; and
      a uni-directional communication where data is transmitted from one of the master device and the slave device to the other by using the slots of remaining channels; wherein
      one of the slots of the selected channel used for transmitting a resend control signal for the data transmitted in the uni-directional communication,
   wherein the master device is configured to execute a service notification phase when a time division wireless link is established between the master device and the slave device, the service notification phase including the step of notifying service contents to the slave device by using a first communication channel selected from the channels in the bi-directional communication to communicate that voice data is to be transmitted in a 1:1 communication and image data is to be transmitted in a N:0 communication, N being an integer equal to or greater than 2.

* * * * *